(12) United States Patent
Gongling

(10) Patent No.: US 10,890,071 B2
(45) Date of Patent: Jan. 12, 2021

(54) ROTARY ENGINE WITH ITS PASSIVE PISTON RUNNING AT VARIABLE SPEED

(71) Applicant: Li Gongling, Jalan Lim Tai See (SG)

(72) Inventor: Li Gongling, Jalan Lim Tai See (SG)

(73) Assignee: Guangzhou Yunshun Mechanic and Electric Co. Ltd., Guangzhou (CN)

(*) Notice: Subject to any disclaimer, the term of this patent is extended or adjusted under 35 U.S.C. 154(b) by 73 days.

(21) Appl. No.: 15/739,492

(22) PCT Filed: Nov. 1, 2016

(86) PCT No.: PCT/CN2016/104168
§ 371 (c)(1),
(2) Date: Aug. 1, 2018

(87) PCT Pub. No.: WO2017/133281
PCT Pub. Date: Aug. 10, 2017

(65) Prior Publication Data
US 2018/0371909 A1    Dec. 27, 2018

(30) Foreign Application Priority Data

Feb. 1, 2016 (CN) .......................... 2016 1 0068010

(51) Int. Cl.
*F01C 1/077* (2006.01)
*F01C 1/063* (2006.01)
(Continued)

(52) U.S. Cl.
CPC .............. *F01C 1/077* (2013.01); *F01C 1/063* (2013.01); *F02B 53/00* (2013.01); *F02B 53/02* (2013.01);
(Continued)

(58) Field of Classification Search
CPC .......... F01C 1/077; F01C 1/073; F01C 21/08; F01C 17/02; F02B 55/02; F02B 53/00
See application file for complete search history.

(56) References Cited

U.S. PATENT DOCUMENTS

| 1,969,711 A | 8/1934 | Hein |
| 3,544,242 A | 12/1970 | Bancroft |

(Continued)

FOREIGN PATENT DOCUMENTS

| CN | 1044697 A | 8/1990 |
| CN | 102926813 A | 2/2013 |

(Continued)

OTHER PUBLICATIONS

International Search Report of International Patent Application No. PCT/CN2016/104168 completed Jan. 10, 2017 and dated Jan. 20, 2017 (4 pages).

(Continued)

*Primary Examiner* — Audrey K Bradley
(74) *Attorney, Agent, or Firm* — Pyprus Pte Ltd

(57) ABSTRACT

One embodiment may include a rotary engine, whose cylinder is in doughnut-shape. A cross-section of the cylinder is circular. The engine includes a pair of rotation disks, a power disk and passive disk. A power-output shaft is coaxial with an axis of the cylinder. A power piston and passive piston rotate around an axis of the power-output shaft. A space between the power piston in front and the passive piston at the back is a working chamber. When combustion and expansion take place in the working chamber, the power piston will be pushed forward continuously by the expanding gases, and output power via the power-output shaft. The passive piston relies on a driving system to drive it moving forward. Volume of the working chamber varies within one revolution of rotation. Larger volume of the working cham- (Continued)

ber causes combustion and expansion. Smaller volume of the working chamber causes compression and emission.

15 Claims, 20 Drawing Sheets

(51) Int. Cl.
  *F02B 53/00* (2006.01)
  *F02B 53/02* (2006.01)
  *F02B 55/02* (2006.01)
  *F02B 55/08* (2006.01)
(52) U.S. Cl.
  CPC .............. *F02B 55/02* (2013.01); *F02B 55/08* (2013.01); *F02B 2730/018* (2013.01); *F02B 2730/03* (2013.01); *Y02T 10/17* (2013.01)

(56) References Cited

U.S. PATENT DOCUMENTS

| | | | | |
|---|---|---|---|---|
| 4,890,591 A | * | 1/1990 | Stauffer | .................... F01B 9/08 123/213 |
| 6,357,397 B1 | * | 3/2002 | Kull | ........................ F01C 1/077 123/18 R |
| 6,446,595 B1 | * | 9/2002 | Sakita | ..................... F01C 1/077 123/245 |
| 2004/0255898 A1 | * | 12/2004 | Demafiles | ............. F01C 1/3446 123/237 |
| 2016/0312611 A1 | * | 10/2016 | Kamath | .................. F01C 1/077 |

FOREIGN PATENT DOCUMENTS

| | | | | |
|---|---|---|---|---|
| CN | 105626241 A | | 6/2016 | |
| GB | 191225945 A | | 11/1913 | |
| GB | 374632 A | * | 6/1932 | ............. F01C 1/063 |
| GB | 374632 A | | 6/1932 | |

OTHER PUBLICATIONS

Written Opinion of International Patent Application No. PCT/CN2016/104168 dated Jan. 20, 2017 (4 pages).

* cited by examiner

ROTARY ENGINE WITH ITS PASSIVE PISTON RUNNING AT VARIABLE SPEED

RELATED APPLICATIONS

This Application is a 371 National Stage Application of International Application No. PCT/CN2016/104168, filed Nov. 1, 2016, which is hereby incorporated by reference in its entirety.

TECHNICAL FIELD

The present invention relates to rotary engines, and more specifically, to rotary engines with variable speed, passive pistons.

BACKGROUND

Most engines in commercial markets are reciprocating engines, where pistons move up and down linearly in the cylinder. Air and fuel are sucked into the cylinder when the piston is moving downward. When the piston is moving upward, air in the cylinder is compressed, causing an increase in air temperature. Igniting by a spark plug, combustion of the mixture of air and fuel may take place in the cylinder. Heated air expands and pushes the pistons downward. Via a connecting rod and a crankshaft, the linear movement of the piston is then converted to a rotating movement of the crankshaft, which then provides power to drive a vehicle, etc. The major issue on linear-to-rotation conversion mechanisms is the power lost, mainly caused by frictional resistance between the mechanical parts. Furthermore, output torque is rather limited. Engine noise and vibration are also a concern.

In contrast to the conventional reciprocating engine, a rotary engine has pistons rotating in one circular direction and produces power output. So far, one technically well-developed rotary engine is the Wankel engine. In a Wankel engine, the piston is in a triangle shape, which rotates eccentrically within an oval-like or epitrochoid-shaped housing. When the piston rotates inside the housing, volume of the working chamber, which is formed between the piston and housing, changes. Within one revolution of the piston's rotation, volume of the working chamber changes from small to large, then from large to small, from small to large, and finally from large to small again. When volume of the working chamber changes from small to large, air is sucked into the chamber. After that, the air inside the chamber is compressed when the chamber volume changes from large to small. After compression, air and fuel inside the working chamber combusts and expands, which causes volume of the chamber to change from small to large again, and at the same time pushes the piston rotating around the crankshaft. As the piston rotates continually, volume of the chamber changes from large to small, pushing the exhausted gases out of the chamber. As a result, within one revolution of the piston's rotation, a full cycle: air intake, compression, combustion and expansion, and emission for the power generation of an engine is accomplished.

The main drawback of a Wankel engine is its oval-like epitrochoid-shaped working chamber, which is geometrically narrow and long, resulting in comparatively high ratio of surface to its volume. This type of working chamber may cause relatively high heat loss and incomplete combustion, hence lower thermal efficiency comparing to a reciprocating engine.

The working principle of most other types of rotary engines are similar to that of the Wankel engine. Most engines focus on different designs for the shapes of the engine's housings and rotors. When the rotor rotates within the engine housing, volume of the working chamber may change accordingly, so that it can fulfill an engine working cycle: air intake, compression, combustion and expansion, and emission to output power.

SUMMARY

A rotary engine has its cylinder in the form of doughnut shape, the cut-view of the cross section of the cylinder is a round shape or an oval shape. An inlet port and an outlet port are opened at the wall of cylinder. There are at least one pair of pistons, called power piston and passive piston inside the cylinder. The working chamber is the space between the power piston in front and the passive piston at the back, surrounded by the inner wall of the cylinder. Fuel is allowed to be sucked or injected into the working chamber. The working processes of an engine, i.e., air intake, compression, combustion and expansion, and emission, take place inside the working chamber. As the power piston is in front of the working chamber, combustion and expansion of air and fuel may push the power piston to move forward and output the generated power via a power-output shaft. However, as the passive piston is at the rear of the working chamber, combustion and expansion of air and fuel may push the passive piston to move backward (a stopping mechanism is required to prevent the passive piston from moving backward). Therefore, a passive piston requires a driving system to drive it moving forward. A driving system, for example, may include a gear on the power-output shaft, an on-off mechanism, a speed-increasing gear system, and a gear on the passive disk. The gear on the power-output shaft drives the on-off mechanism. When the on-off mechanism is at off mode, it does not drive the speed-increasing gear system, which in turn does not drive passive disk, thus the passive piston slow down to its stationary position. When the on-off mechanism is at on mode, it drives the speed-increasing gear system, which in turn drives the passive disk to rotate at higher speed than that of the power disk, thus the passive piston to rotate at higher speed than that of the power piston.

Both power piston and passive piston rotate along the inner tube of doughnut-shaped cylinder. Within one revolution of piston's rotation, the power piston may rotate continuously at a constant speed, or nearly constant speed, while the passive piston, driven by a driving system, rotates at variable speeds. More narrowly, it rotates faster than the power piston in some periods of one revolution, but slower or even stop in other periods. In such a pattern of rotation, volume of the working chamber is varying within one revolution of piston's rotation. Volume of the working chamber becomes smaller when the passive piston rotates faster than the power piston; volume of the working chamber is enlarged when the passive piton decelerates until stop. If volume of the working chamber varies within one revolution of piston's rotation, the full cycle of an engine, i.e., air intake, compression, combustion and expansion, and emission, is able to be accomplished.

To explain how the rotary engine accomplishes the full cycle of power generation, an implementation of rotary engine is taken as an example. In the first implementation of the rotary engine, there are two pairs of power pistons and passive pistons moving along inside the inner tube of doughnut-shape cylinder. Two power pistons are mounted oppositely at the edges of the power disk. Similarly, two passive pistons are also mounted oppositely at the edge of the passive disk. The power-output shaft is fixed vertically at the center of the power disk and goes through a bushing or a bearing, which is mounted at the center of the passive disk. The power piston and passive piston rotate around the axis of the power-output shaft. As the power-output shaft is mounted at the center of doughnut-shaped cylinder, the axis of the power-output shaft is coaxial with the axis of doughnut-shape cylinder. Hence the rotary movement of pistons may never touch the inner wall of the cylinder if they are designed and machined precisely. The rotary movement of pistons may not generate friction in this rotary engine (except the friction generated by seal rings of the pistons).

In first implementation, there is a special designed gear which is fixed onto the power-output shaft. A special gear has teeth partially distributed at its circumference, called partially toothed gear, i.e., some sections of its circumference are toothed, but some other sections are smooth surface and no teeth on them. One of the teething method is quarterly teeth distribution. More precisely, there are teeth at the first quarter of its circumference, but at the next quarter of its circumference, there are no teeth, and gear teeth appear again at the follow quarter of its circumference; and at the last quarter of its circumference, there are no teeth. The partially toothed gear on the power-output shaft drives a gear (and train) system. The gear system increases the rotation speed and subsequently drives the gear mounted on the bushing of the passive disk, so that the partially toothed gear on the power-output shaft eventually drive the passive pistons. More details, when the first non-teeth section of the partially toothed gear turns to the gear system, the gear system stop rotating, so do the passive disk and the passive pistons. Later, when the teeth section of the partially toothed gear engages the gear system, the gear system not only transmits power from the power-output shaft to the passive pistons, but also increases the rotation speed of the passive pistons. When the second non-teeth section of the partially toothed gear turns to the gear system, the gear system stop rotating again, so do the passive pistons. When the next teeth section of the partially toothed gear engages with the gear system, the gear system drives the passive pistons again at substantially higher speed than that of the power piston. In summary, within one revolution of piston's rotation, the power pistons may rotate continuously at a constant speed or at nearly constant speed along the doughnut-shaped cylinder, while the passive pistons rotate at variable speeds as it is driven by a driving system, which may include a partially toothed gear fixed onto the power-output shaft, a speed-increasing gear system, and the gear fixed on the bushing of passive disk (or directly fixed on the passive disk). Details of the working processes of the rotary engine are described in following section.

At the moment when a power piston spin to the air inlet ports, the non-teeth portion of partially toothed gear turns to the gear system. Since there are no teeth for engagement, the gear system stops its rotation and does not drive the passive disk. Therefore the passive piston is at its stationary position. As the power piston moves continuously at a constant speed, or nearly constant speed, the distance between the power piston in front and passive piston at the back is increased, so is volume of the working chamber. The increase in the volume of the working chamber may suck in fresh air through the air inlet port. As the power piston rotates continuously and reaches at a certain point, the teeth portion of partially toothed gear starts to engage the gear system, which then drives the passive piston to rotate. When the passive piston passes over the air inlet ports, the air intake process is completed. As the passive piston moves faster than the power pistons, it gradually catches up the power piston in front. The distance, between the power piston in front and passive piston at the back, becomes smaller and smaller, so does volume of the working chamber. Therefore, the mixture of air and fuel is compressed inside the chamber. At the nearly end of the compression process, the mixture of air and fuel is ignited by spark plugs and combustion then takes place. At this point of time, the passive piston is at its stationary positions again, since the non-teeth portion of the partially toothed gear turns to the gear system. In this period, the mixture of air and fuel may combust and expand, and the expansion of gases may push the power piston to move forward and to output power though the shaft. When the power piston rotates continuously and reaches the exhaust outlet port, at this moment, the teeth portion of the partially toothed gear starts to engage the gear system which then drives the passive piston to rotate. Since the passive piston rotates at twice speed of the power piston, the passive piston may gradually catch up the power piston, and push the exhausted gas out through the outlet port. After the passive piston passes over the exhausted gas outlet ports, the emission process is completed. At this moment, the non-teeth portion of partially toothed gear turns to the gear system, the passive piston is at its stationary positions again. As the power piston rotates continuously at a constant speed and passes over the air inlet ports, air intake process starts once again. In such a manner, the processes of air intake, compression, combustion and expansion, and emission, are repeated again and again, hence the engine runs continuously and output power through the power-output shaft.

DETAILED DESCRIPTION OF NUMERALS IN DRAWINGS

Figure 1:
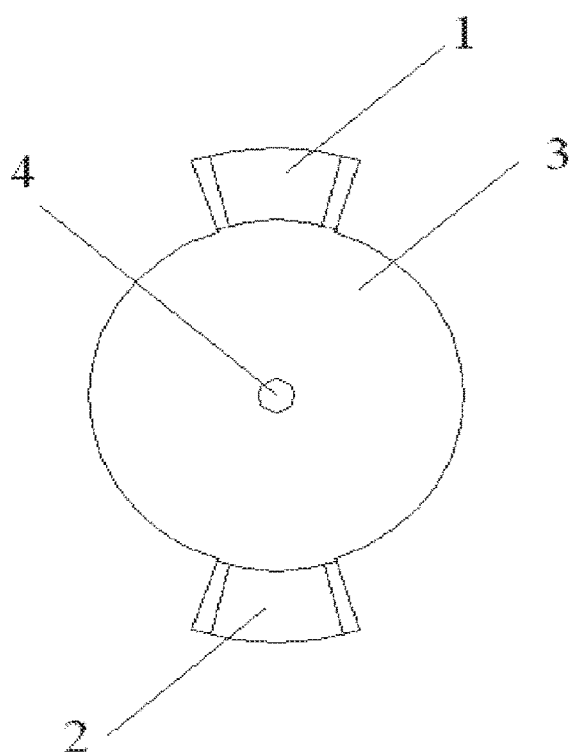
FIG. 1 is a front perspective view of power pistons and a power disk according to an embodiment of the present invention.

1. First power piston, 2. Second power piston, 3. Power Disk, 4. Power-output shaft, 5. First passive piston, 6. Second passive piston, 7. Passive disk, 8. Bushing, at the center of the passive disk, 9. Left cylinder body, 10. Right cylinder body, 11. Cover of the gear box, 12. Doughnut shaped cylinder, 13. Bolt, 14. Bushing for left cylinder body, 15. Bushing for gear box, 16. Partially toothed gear, 17. Speed-increasing gear, 18. Second speed-increasing gear, 19. Gear on the passive disk, 20. Air inlet port, 21. Exhaust gas outlet port, 22. Working chamber, 23. Third power piston, 24. Third passive piston, 25. Fourth power piston, 26. Driving gear, 27. The gear co-axis with driver plate, 28. Driver plate, 29. Geneva star wheel, 30. Slot on the Geneva star wheel, 31. Pin on the driver plate, 32. Spring, 33. Fourth passive piston, 34. Second working chamber.

DETAILED DESCRIPTION OF THE DRAWINGS

A type of rotary engine, whose cylinder is in doughnut-shape, is described. A cross-sectional cut-view of a cylinder is substantially in a shape of a circle or an oval. There may be a pair of rotation disks, called power disk and passive disk respectively. A power-output shaft may be vertically mounted at a center of the power disk, and a bushing may be mounted at a center of the passive disk. A power-output shaft inserts through the bushing of the passive disk. Bearings may be placed in between the power-output shaft and the bushing. The power-output shaft may be placed at a center of the cylinder, so that an axis of the power-output shaft may be coaxial with an axis of the doughnut-shape cylinder. In one embodiment, the rotary engine has at least one power piston and one passive piston. The power piston is mounted at an edge of the power disk, and the passive piston is mounted at an edge of passive disk. The power pistons and passive pistons rotate around the axis of the power-output shaft inside the doughnut-shaped cylinder. A space between the power piston in front and the passive piston at the back, surrounded by an inner wall of the cylinder, is a working chamber, wherein fuel may be allowed to be sucked or injected into the working chamber only.

Within one revolution of rotation, as the power piston is in front of the working chamber, when combustion and expansion take place in the working chamber, the power piston may be pushed forward continuously by expanding gases, and output power via the power-output shaft. However, since the passive piston is at the back of the working chamber, combustion and expansion of air and fuel inside the working chamber may push the passive piston moving backward. Therefore, the passive piston may rely on a driving system to drive it moving forward. A few embodiments of a driving systems proposed for the rotary engine are described. One of ordinary skill in the art will appreciate that additional driving systems exist and are operable in the rotary engine. One embodiment of the driving system may be that the power-output shaft drives a gear/chain system, which may finally drive the passive disk as well as the passive piston.

The passive piston, driven by a driving system, may rotate at a variable speed within one revolution of rotation, i.e., the passive piston is at stationary position in a first period of one revolution; but in a second period of one revolution, the passive piston may accelerate until reaching a speed that is faster than that of the power piston. Subsequently, in a following period of one revolution, the passive piston may decelerate until stopping. Finally, in a last period of one revolution, the passive piston accelerates again until reaching a speed that may be faster than that of the power piston.

In such a pattern of rotation, volume of the working chamber may be varying within one revolution of rotation. Volume of the working chamber may become smaller when the passive piston rotates faster than the power piston. Volume of the working chamber may be enlarged when the passive piston decelerates or stops. A change in volume of the working chamber may be illustrated in detail, as follows.

In the first period of one revolution of rotation, the passive piston may be at a stationary position and volume of the working chamber is enlarged as the power piston rotates continuously at a constant speed, or substantially constant speed. In the first period, fresh air may be sucked into the working chamber. In the second period of one revolution, the passive piston may accelerate to substantially catch up with the power piston, thus the volume of working chamber becomes smaller and air inside the working chamber may be compressed. In the third period of one revolution, a mixture of air and fuel may combust and expand to push the power piston rotating, which may output power through the power-output shaft. In the last period of one revolution, the passive piston may accelerate to catch up the power piston again, thus volume of the working chamber may become smaller, and exhausted gas may be pushed out of the working chamber by the passive piston. Therefore, within one revolution of rotation, a full cycle of power generation may be accomplished. The full cycle of power generation may be substantially similar as working processes of a reciprocating engine.

FIG. 1 to FIG. 19 are drawings for a first implementation of the rotary engine.

Figure 2:
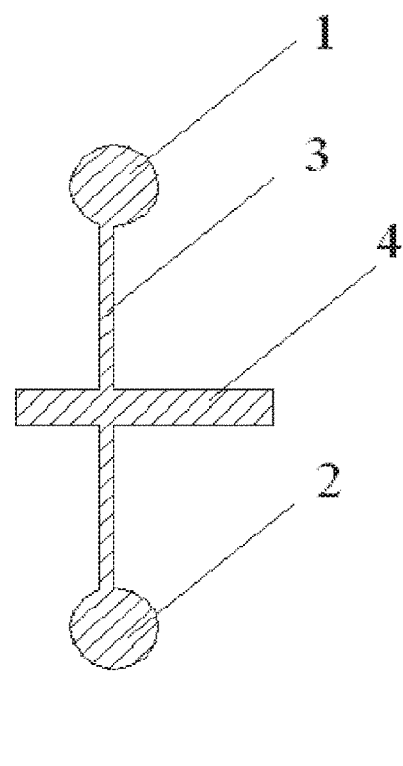
FIG. 2 is a side perspective view of power pistons and a power disk according to an embodiment of the present invention.
Figure 3:
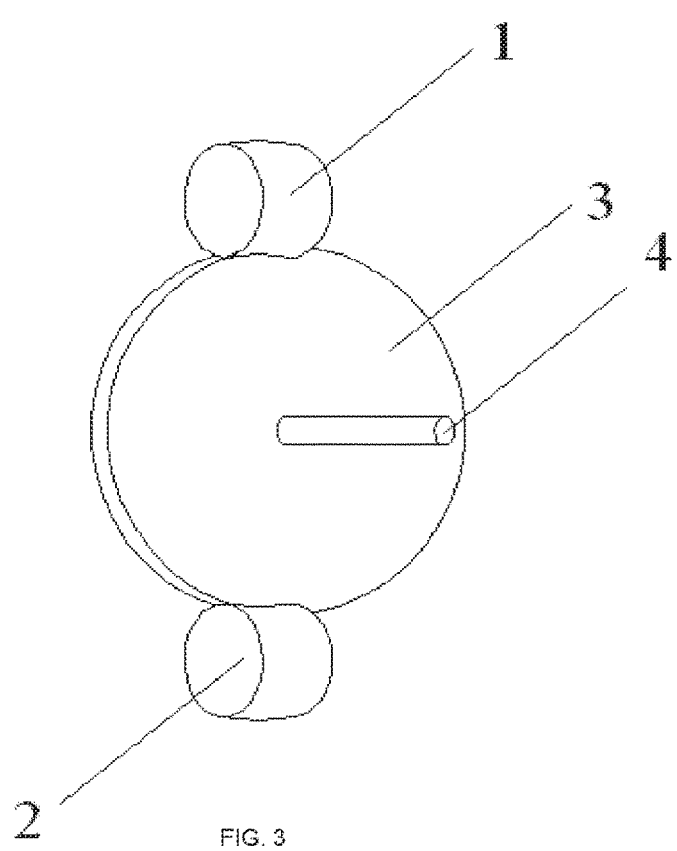
FIG. 3 is a perspective view of power pistons and a power disk according to an embodiment of the present invention.
Figure 4:
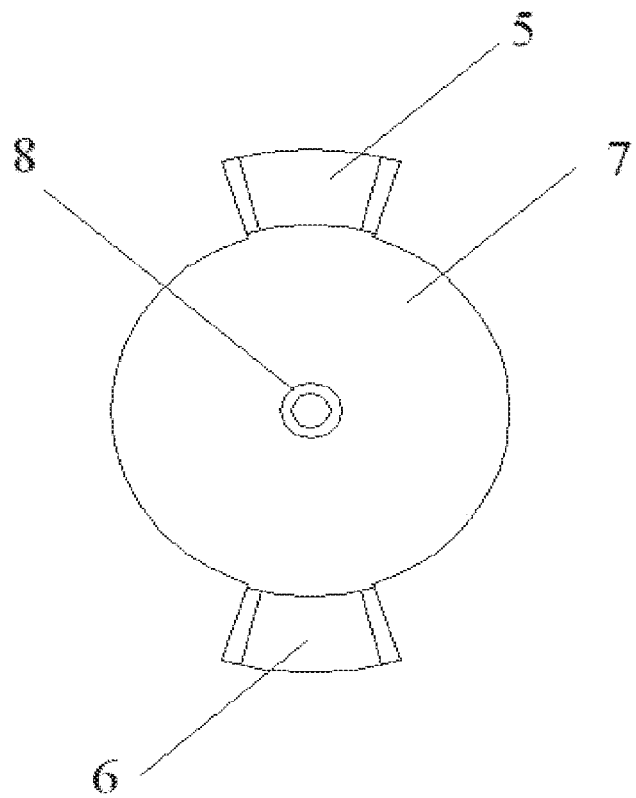
FIG. 4 is a front perspective view of passive pistons and a passive disk according to an embodiment of the present invention.
Figure 5:
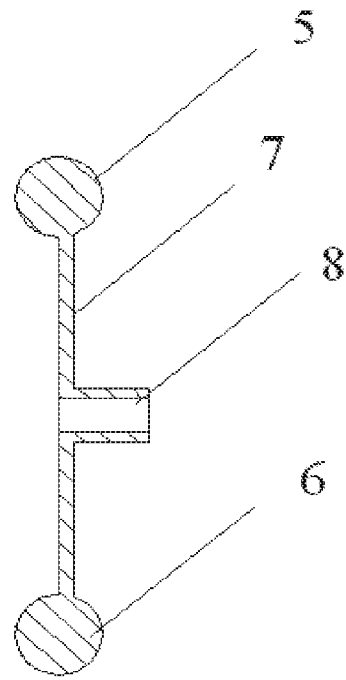
FIG. 5 is a side perspective view of passive pistons and a passive disk according to an embodiment of the present invention.
Figure 6:
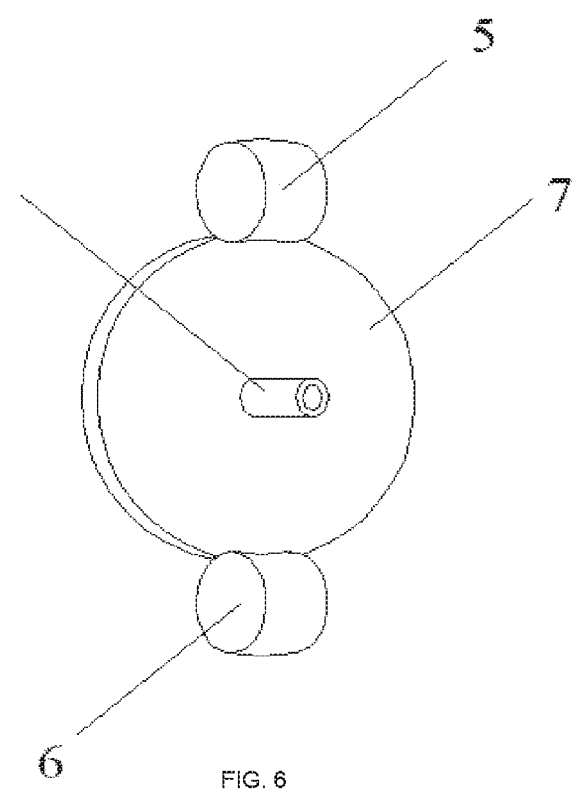
FIG. 6 is a perspective view of passive pistons and a passive disk according to an embodiment of the present invention.
Figure 7:
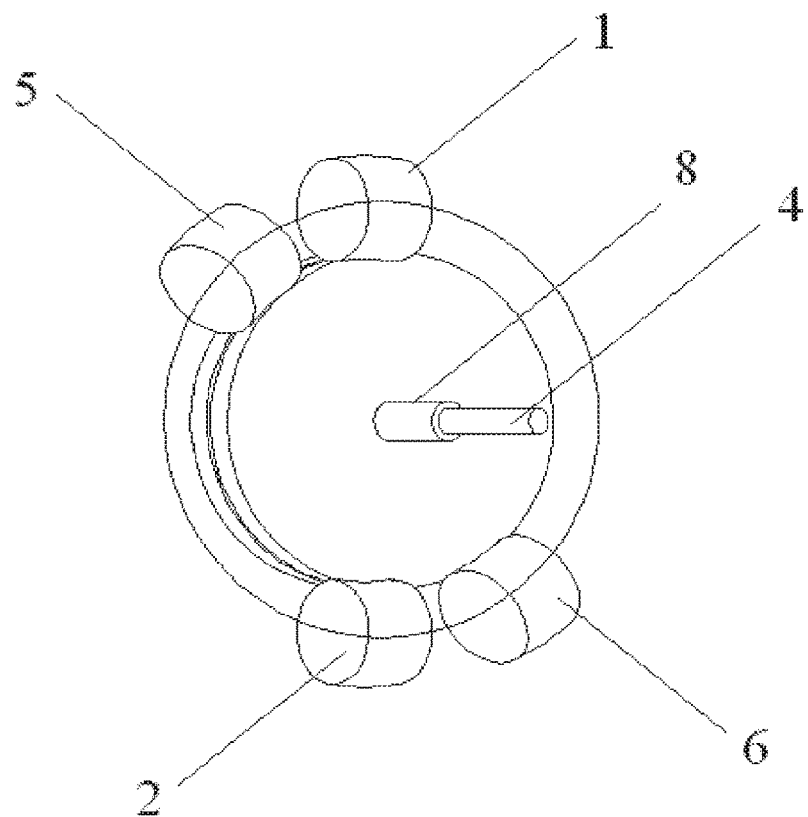
FIG. 7 shows a power disk and a passive disk, where a power-output shaft of the power disk inserts into a bushing of the passive disk.

In one embodiment, a rotary engine may comprise two power pistons 1 and 2. FIG. 1 is a front view of the power pistons 1 and 2, and a power disk 3. FIG. 2 is a side view, and FIG. 3 is a perspective view of the power pistons 1 and 2, together with the power disk 3. Power pistons 1 and 2 may be mounted at an edge of the power disk 3, opposite each other. An output shaft 4 may be perpendicularly fixed at a center of the power disk 3. Power disk 3 can rotate around an axis of shaft 4, as well as the power pistons 1 and 2. The rotary engine may comprise two passive pistons 5 and 6. FIG. 4 is a front view of the passive pistons 5 and 6, and a passive disk 7. FIG. 5 is a side view and FIG. 6 is a perspective view of the passive disk 7 with the passive pistons 5 and 6. The passive pistons 5 and 6 may be mounted opposite each other and at an edge of the passive disk 7. Passive disk 7 comprises a bushing 8 at its center. Power-output shaft 4 on power disk 3 inserts through the bushing 8 of passive disk 7, as shown in FIG. 7. Therefore, passive disk 7 may rotate around the axis of shaft 4, as well as passive pistons 5 and 6. Power pistons in front and passive pistons behind are considered as a pair of working pistons. For instance, power piston 1 and passive piston 5 are formed as a pair of working pistons. In addition, power piston 2 and passive piston 6 are formed as another pair of working pistons. A space between the power piston in front and the passive piston at the back, and surrounded by the cylinder wall, may be defined as a working chamber. More specifically, a space between power piston 1 and passive piston 5 surrounded by an inner wall of the cylinder is working chamber 22, and a space between power piston 2 and passive piston 6 surrounded by the inner wall of the cylinder is another working chamber 34, as is further described herein with regards to FIG. 11. Fuel may be allowed to be injected or taken into working chamber only. The working processes may comprise steps of air intake, compression, combustion and expansion, and emission. The working process may take place inside the working chamber. However, the space between the passive piston in front and power piston at the back may not be in use.

Figure 8:
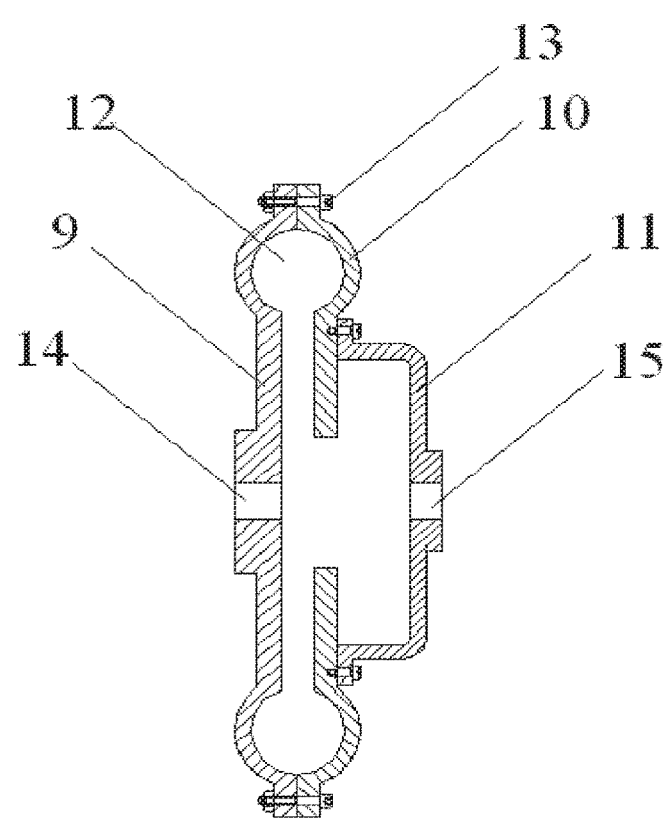
FIG. 8 is a cutaway sectional view of a doughnut-shaped cylinder.
Figure 10:
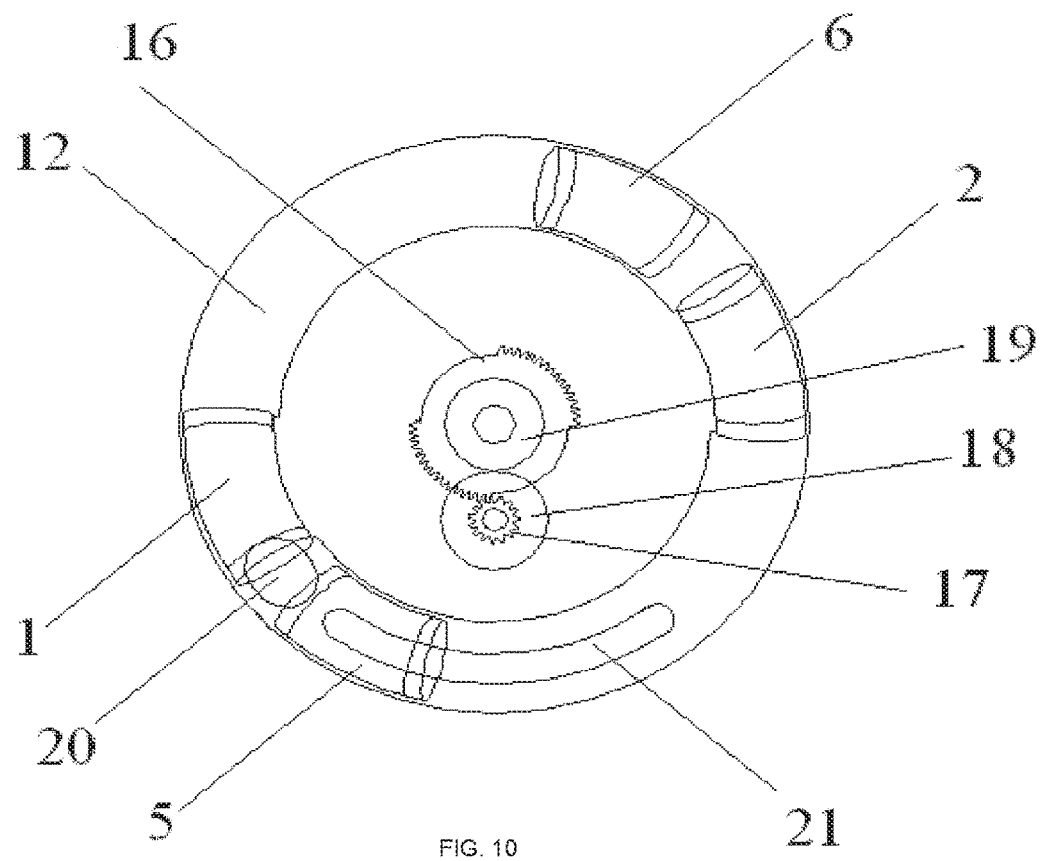
FIG. 10 is a sketch containing a partially toothed gear and a gear system.

Cylinder 12 of the rotary engine may be a doughnut shape (see FIG. 10). FIG. 8 is a cutaway sectional view of cylinder 12 and gear box cover 11. Doughnut-shaped cylinder 12 may be formed by left cylinder body 9 and right cylinder body 10, and may fasten by screw bolts 13. A gear box cover 11 may be mounted to right cylinder body 10. Both left cylinder body 9 and gear-box cover 11 have bushings 14 and 15 at their centers respectively. In another embodiment, bushing 14 may be mounted at right cylinder body 10 instead of gear-box cover 11.

Figure 9:
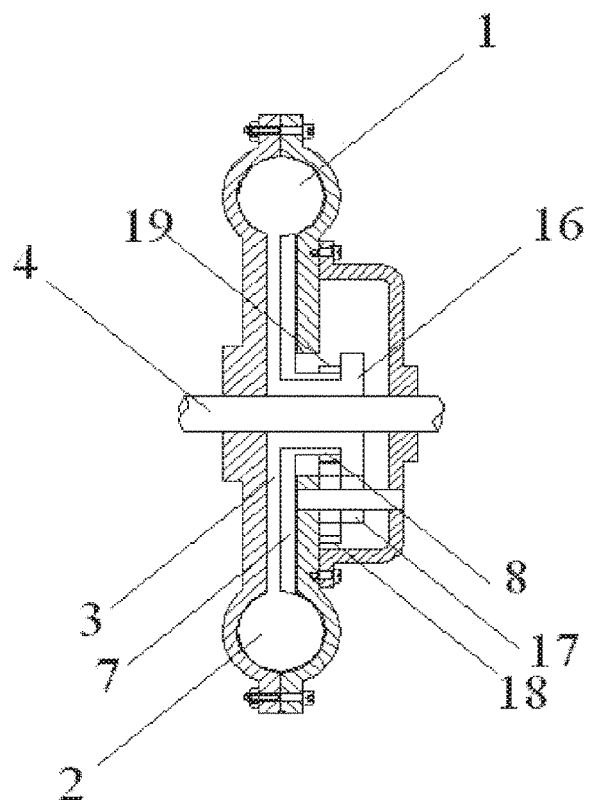
FIG. 9 is a cutaway view of assembled rotational parts of a rotary engine.

FIG. 9 is a cutaway view of an assembly drawing for a rotary engine. Power-output shaft 4 on power disk 3 inserts through bushing 8, which is at a center of passive disk 7. As shown in FIG. 10, power pistons 1 and 2, and passive pistons 5 and 6 are located inside doughnut-shaped cylinder 12. Power-output shaft 4 goes through left cylinder body bushing 14 (FIG. 8) and gear box cover bushing 15 (FIG. 8). The central axis for bushing 14 and 15 coincides with the central axis of doughnut-shape cylinder 12. Therefore, the rotational axis of power piston 1 and 2 and passive piston 5 and 6 coincide with the central axis of cylinder 12. In this case, the pistons 1, 2, 5, and 6 rotate along doughnut-shaped cylinder 12 and may never touch the inner wall of cylinder 12 if the rotary engine is designed and machined precisely. This way of rotation ensures significant reduction of the frictional loss for the engine. An air inlet port 20 and exhaust gas outlet port 21 may be on the cylinder wall, as shown in FIG. 10.

In the first implementation, the driving system to drive passive pistons 5 and 6 comprises special driving gear 16, which is mounted onto power-output shaft 4, a speed-increasing gear system and a gear 19, which is mounted on passive disk 7, as shown in FIG. 10. The teeth on the special driving gear 16 may be configured in a partially distributed pattern. Special driving gear 16 is referred to as a partially toothed gear. In one embodiment, the teeth distribution for gear 16 is a so called quarterly distribution, meaning that there are teeth at the first quarter of the gear's circumference, but no teeth at the next quarter of the gear's circumference, there are teeth at the following quarter of gear's circumference again, but no teeth at the last quarter of the gear's circumference, as shown in FIG. 10. Partially toothed gear 16 drives speed-increasing gear 17. Coaxial with gear 17, another speed-increasing gear 18 drives gear 19 which is attached to passive disk 7, as shown in FIG. 9 and FIG. 10. Through a speed-increasing gear system which may include gear 17 and 18 in this implementation, the rotating speed of passive disk 7 can reach approximately twice a speed of power disk 3. As a result, passive pistons 5 and 6 can rotate at a speed which is approximately twice the speed of power pistons 1 and 2.

During one revolution of shaft 4, in first quarter of the revolution, non-teeth section of gear 16 turns to gear 17, and passive pistons 5 and 6 may stop due to no engagement. In a second quarter of the revolution, a toothed section of the partially toothed gear 16 engages gear 17. Gear 18 drives passive disk 7. Hence passive pistons 5 and 6 rotate at twice the speed of power pistons 1 and 2. In the following quarter of the revolution, non-teeth section of gear 16 turns to gear 17 again, passive pistons 5 and 6 may stop due to no engagement. In the last quarter of the revolution, the toothed section of gear 16 engages gear 17 once more, causing gear 18 to drive passive disk 7. Hence passive pistons 5 and 6 rotate at twice the speed of power pistons 1 and 2.

As a conclusion, in one revolution of shaft 4, power pistons 1 and 2 rotate continuously at a constant, or nearly constant speed, along cylinder 12. However, passive pistons 5 and 6, driven by a driving system containing a partially toothed gear 16, rotate at an intermittent pattern. That is, the passive pistons may accelerate to reach twice the speed of power pistons 1 and 2 at some periods, but they may decelerate until stop at other periods.

Following is an explanation on a working principle of the first implementation of the rotary engine.

Figure 11:
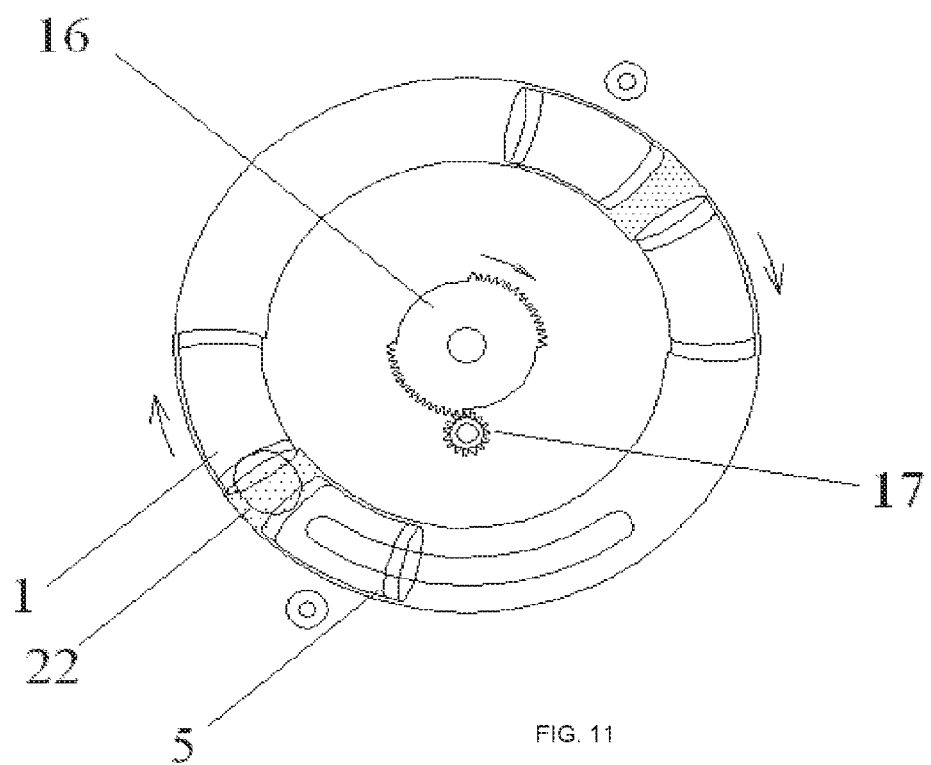
FIG. 11 is a schematic diagram of a working principle of an embodiment of the present invention, indicating that an air intake process inside a working chamber just starts, highlighted with dotted filling.

FIG. 11 shows that a non-teeth section of gear 16 turns to speed-increasing gear 17. Since no engagement exists with gear 17, passive piston 5 is at a stationary position. Working chamber 22 moves to air inlet port 20 (FIG. 10). As a result of piston 1 moving continuously, volume of working chamber 22 is gradually increasing. Fresh air or a mixture of air and fuel is then sucked into working chamber 22.

Figure 12:
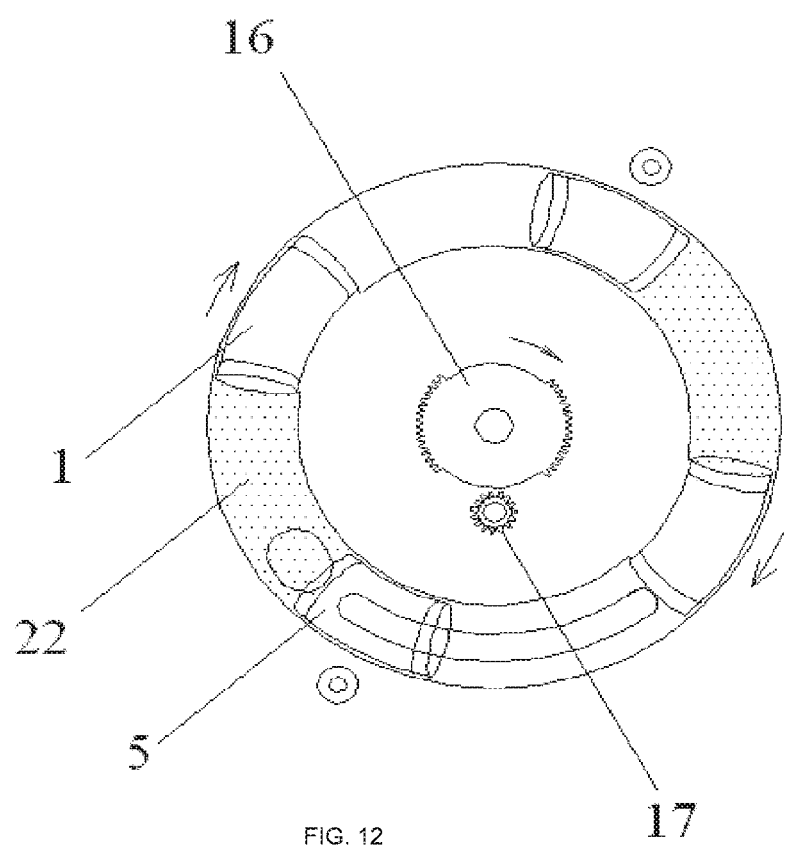
FIG. 12 shows an air intake process inside a working chamber at half way, highlighted with dotted filling.

FIG. 12 shows that the non-teeth section of gear 16 is still facing speed-increasing gear 17. At this period, passive piston 5 remains stationary. Due to continuous rotation of power piston 1, volume of working chamber 22 may be continuously increasing. Fresh air, or mixture of air and fuel is sucked into the working chamber 22. The working chamber 22 is at halfway of the intake process.

Figure 13:
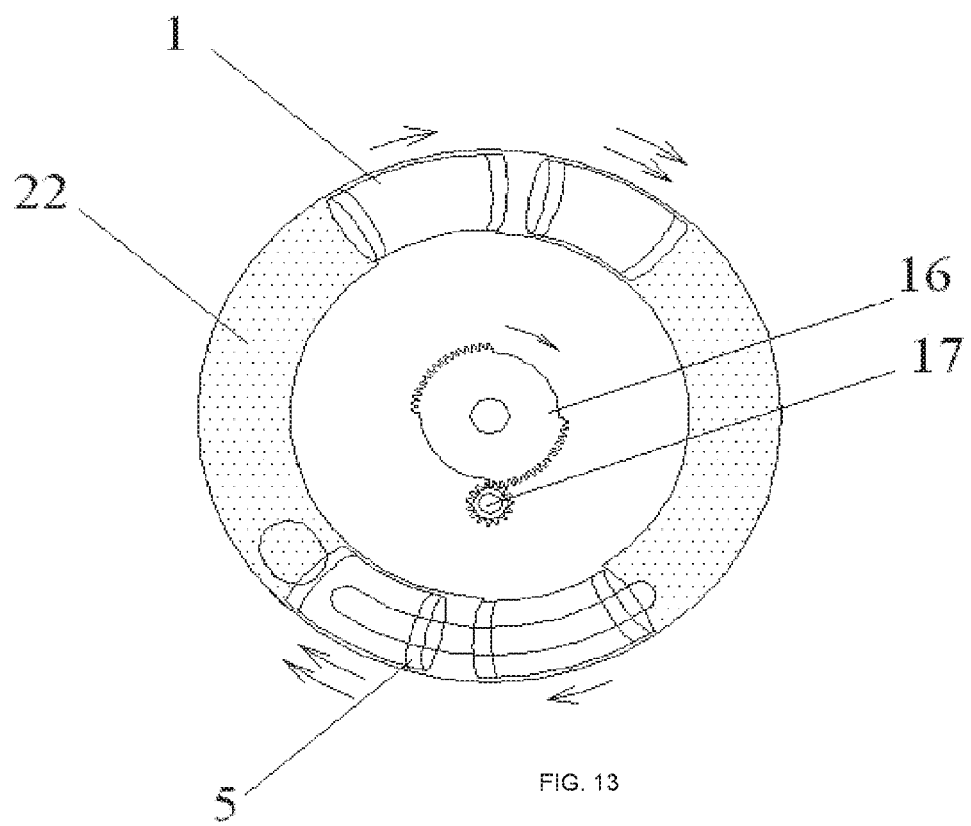
FIG. 13 shows a working chamber at an end of an air intake process, highlighted with dotted filling.

FIG. 13 shows that a toothed section of gear 16 starts to engage speed-increasing gear 17, and gear 18 drives passive disk 7, hence passive piston 5 rotates at twice a speed of power piston 1. At this moment, volume of working chamber 22 reaches its maximum and the air intake process ends.

Figure 14:
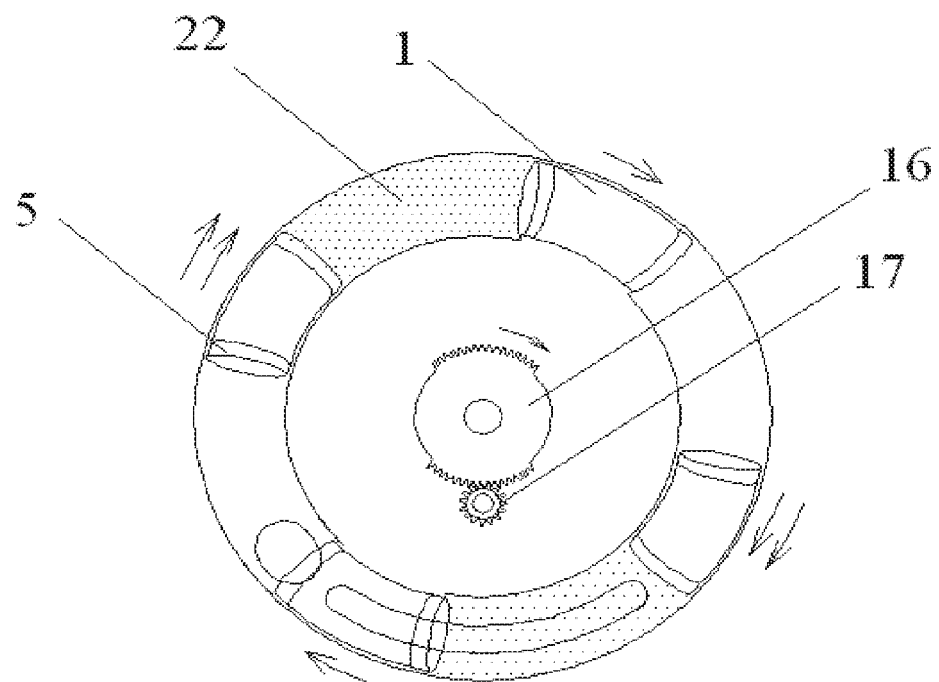
FIG. 14 shows a compression process taking place in a working chamber, which is highlighted with dotted filling.

FIG. 14 shows passive piston 5 with faster speed chasing power piston 1 in front. Volume of working chamber 22 is gradually decreased. The fresh air, or the mixture of air and fuel in chamber 22 is compressed.

Figure 15:
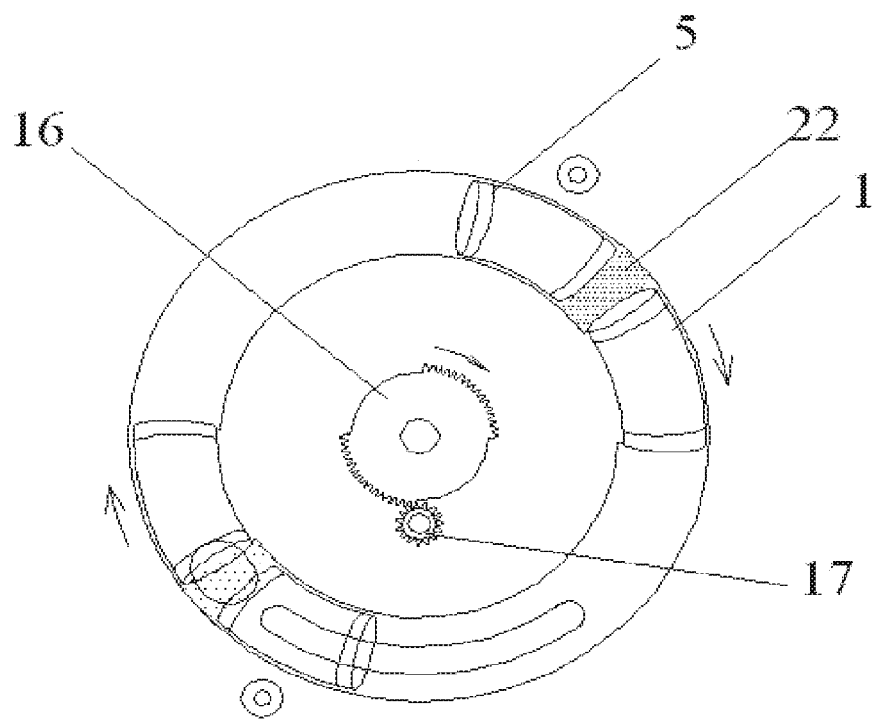
FIG. 15 shows working chambers highlighted with dotted filling, where a compression process approaches completion and a combustion process is going to start.

FIG. 15 shows that another non-teeth section of gear 16 turns to gear 17 without engagement. Passive piston 5 stops again. At approximately this moment, volume of working chamber 22 is at its minimum. Working chamber 22 is at an end of a compression process, and the mixture of air and fuel in chamber 22 is ignited.

Figure 16:
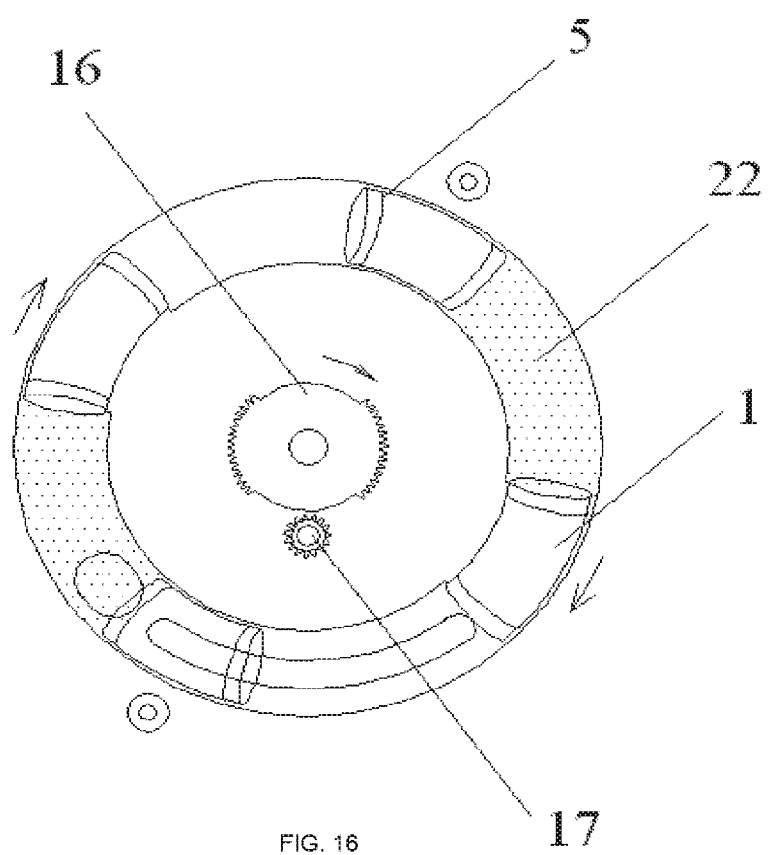
FIG. 16 shows a combustion process taking place inside working chambers, which is highlighted with dotted filling.

FIG. 16 shows that the non-teeth section of gear 16 is still facing gear 17. At this period, passive piston 5 remains at a stationary position. The mixture of air and fuel in working chamber 22 combusts and expands to cause power piston 1 to rotate, which outputs power via shaft 4. In one embodiment, a stopper kit to prevent passive piston 5 from moving backward during the combustion period is present.

Figure 17:
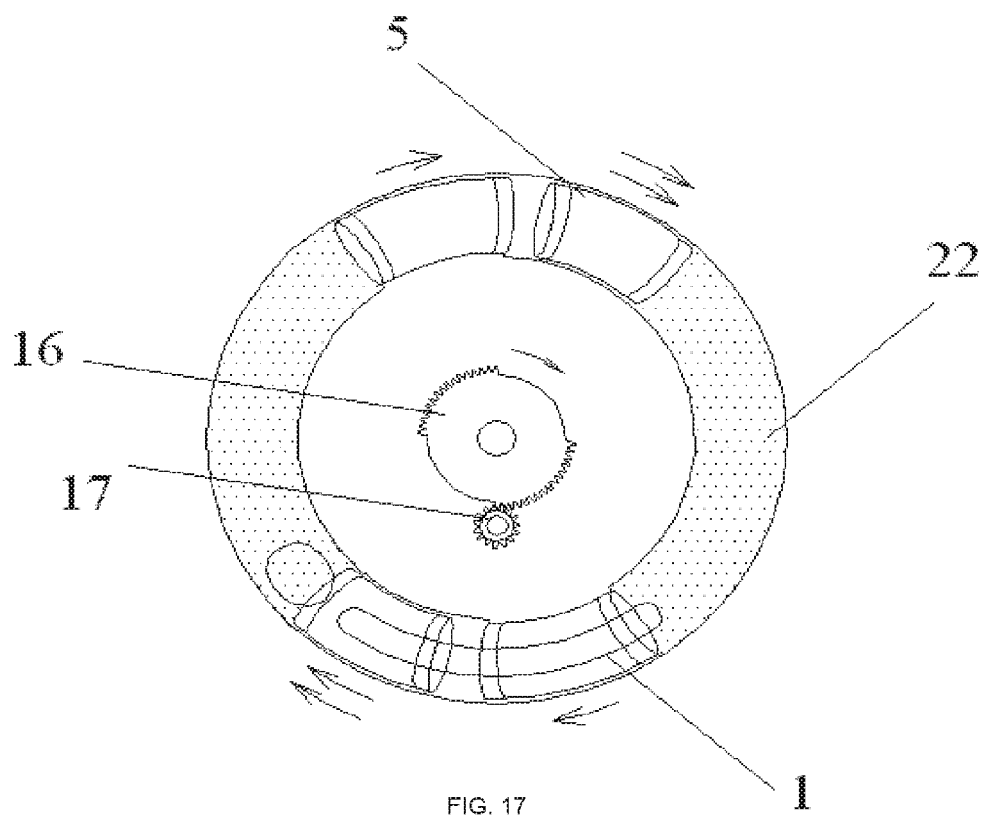
FIG. 17 shows exhausted gas inside a working chamber, which is highlighted with dotted filling, starting to exit from an outlet port.

FIG. 17 shows that the toothed section of gear 16 starts to engage gear 17 once again, gear 18 drives passive disk 7, hence passive piston 5 rotates at twice the speed of power piston 1. At approximately this moment, power piston 1 spins to exhaust gas outlet port 21, and exhausted gas in working chamber 22 starts to be released from outlet port 21.

Figure 18:
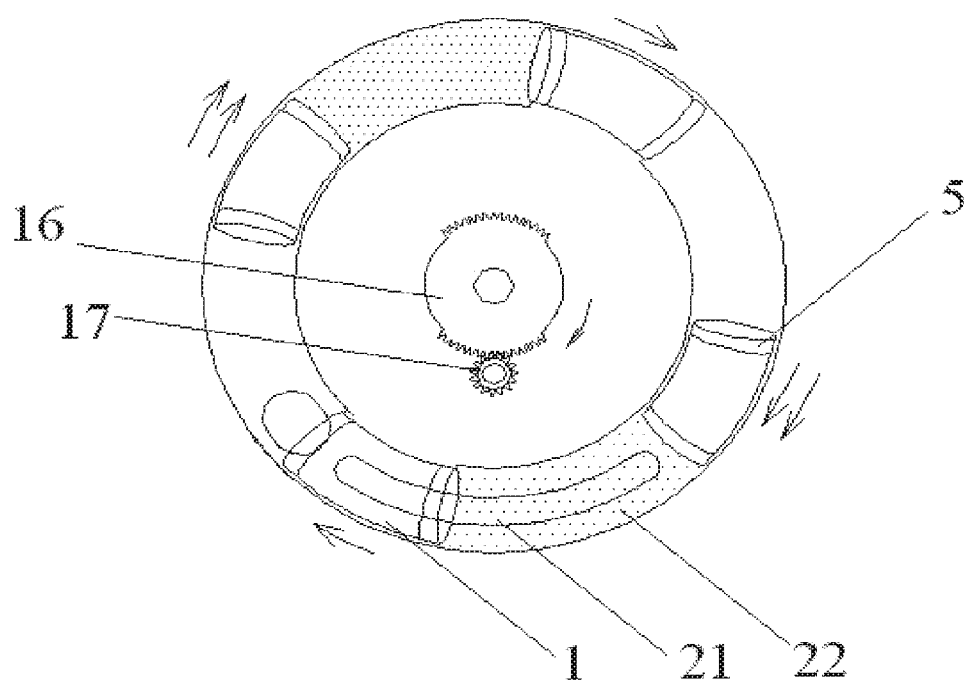
FIG. 18 shows a chamber at half way of an emission process, highlighted with dotted filling.

FIG. 18 shows passive piston 5 with much faster speed chasing up power piston 1 in front. As a result, volume of working chamber 22 is gradually decreased, so that the exhausted gas is pushed out from outlet port 21 by passive piston 5.

Figure 19:
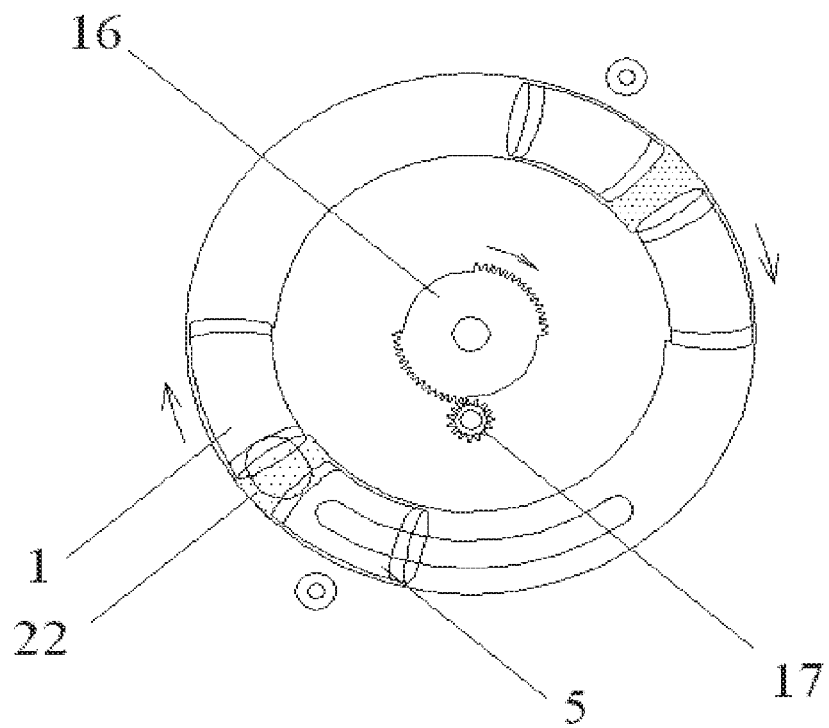
FIG. 19 shows a chamber, highlighted with dotted filling, sliding to a position where an air intake process starts again.

FIG. 19 shows that the non-teeth section of gear 16 turns to gear 17 without engagement. Passive piston 5 may be at its stationary position. Working chamber 22 reaches air inlet port 20. As power piston 1 is continuously rotating, volume of working chamber 22 increases gradually. Fresh air, or the mixture of air and fuel is sucked into working chamber 22.

Working chamber 22 returns to working status, as shown in FIG. 11. The process described above may be configured to repeat again and again as the engine runs continuously.

From the above description for the first implementation of rotary engine, it is known that, within one revolution of rotation of shaft 4, four typical processes of an engine are completed. In conclusion, the first implementation of the rotary engine is theoretically working. However, the partially toothed gear presented here is a preliminary step. An impact force may be reduced at a moment when the toothed section of gear 16 starts to engage gear 17 in a condition that the partially toothed gear has been optimized.

Following is a second implementation of the rotary engine. A driving system may include a normal gear 26 attached onto power-output shaft 4, a Geneva mechanism, a speed-increasing gear system, and a gear on the passive disk. The Geneva mechanism may be used to transmit a continuous rotation to an on-off rotation.

Figure 20:
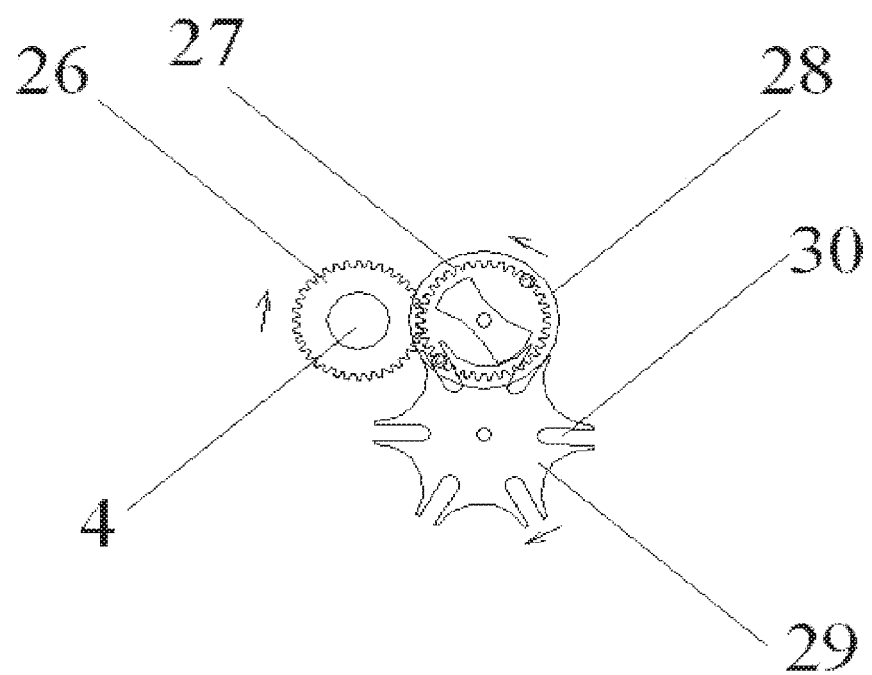
FIG. 20 is a schematic sketch of a Geneva Mechanism according to an embodiment of the present invention, where the Geneva star wheel is set as transparent for the purpose of clear showing of the driving wheel and star wheel.

FIG. 20 is a schematic sketch of the Geneva Mechanism used in the second implementation. A normal gear 26 is attached onto power-output shaft 4. Driven by driving gear 26, gear 27 is coaxial with driver plate 28. For better illustration of gear engagement between driving gear 26 and gear 27, driver plate 28 is set as transparent in this FIG. 20.

Figure 21:
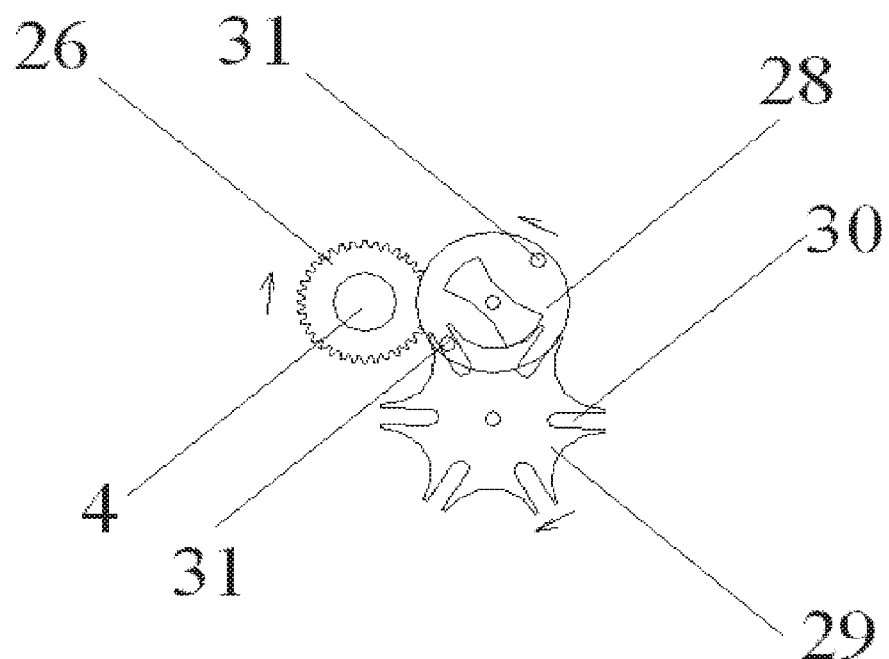
FIG. 21 is a front perspective view of a Geneva Mechanism according to an embodiment of the present invention.

FIG. 21 is a front prospective view of the Geneva mechanism, where driver plate 28 is not transparent. As power piston 1 rotates continuously at a constant speed, driving gear 26 rotates continuously clockwise at a constant speed too, which then drives gear 27 and driver plate 28 to rotate counter-clockwise at a constant speed. Driver plate 28 comprises two pins 31, which take turns to slot into slot 30 on Geneva star wheel 29 and may push it rotating in an intermittent pattern. An additional gear, not shown in the figures, which may be coaxial with Geneva star wheel 29, drives a speed-increase gear system which is not shown in the Figures. The speed-increasing gear system may then drive gear 19 on passive disk 7 which is not shown in the Figures. Using the Geneva mechanism, the passive pistons may rotate in an intermittent pattern, i.e. stopping for a period, and rotating at high speed in another period. Following sections discuss the above in further detail.

Figure 22:
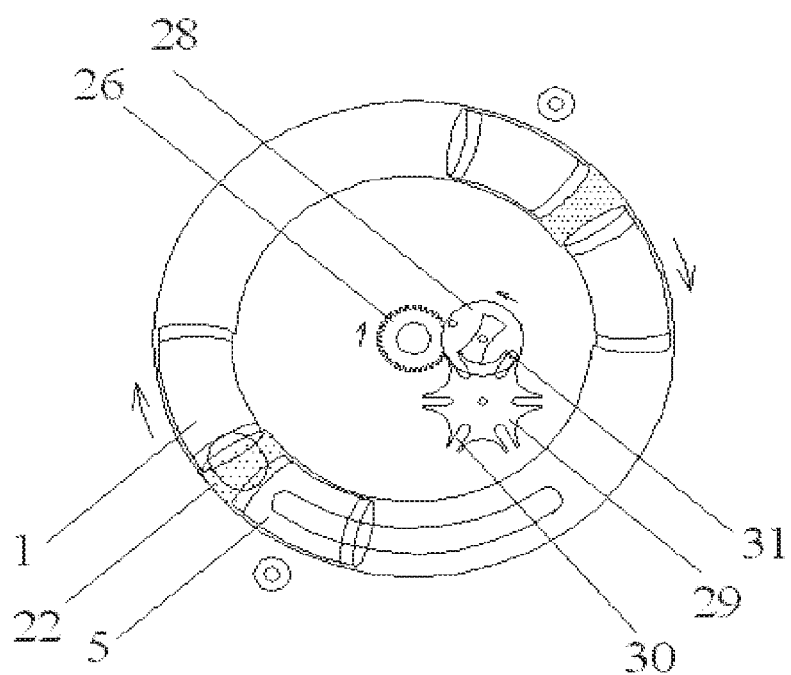
FIG. 22 is a sketch showing a working principle of an embodiment of the present invention using a Geneva mechanism, where a working chamber, highlighted with dotted filling, is at a beginning of an air intake process.

FIG. 22 is a sketch showing a working principle of the second implementation using the Geneva mechanism. Power piston 1 rotates continuously at a constant speed, in a clockwise direction, as shown by arrows. Similarly, driving gear 26 rotates at a constant speed and in a clockwise direction. Gear 26 drives gear 27 and driver plate 28 to rotate at a constant speed in a counter-clockwise direction. Gear 27 is located behind, and coaxial to, driving plate 28 and, therefore, not shown in the figure. At approximately that moment, as indicated in FIG. 22, one of the pins 31, which are mounted on driver plate 28, is moving out from slot 30 of the Geneva star wheel 29. Without engagement by the one of the pins 31, the Geneva star wheel 29 does not spin at. Therefore, passive piston 5 is at its stationary position. In one embodiment, Geneva star wheel 29 may drive a speed-increasing gear system which may increase speed and eventually drive passive disk 7 as mentioned hereinabove. At this period, working chamber 22 moves to air inlet port 20. As power piston 1 is rotating continuously and passive piston 5 is at stationary position, volume of working chamber 22 is increasing gradually, thus the fresh air or the mixture of air and fuel is sucked into working chamber 22 through inlet port 20.

Figure 23:
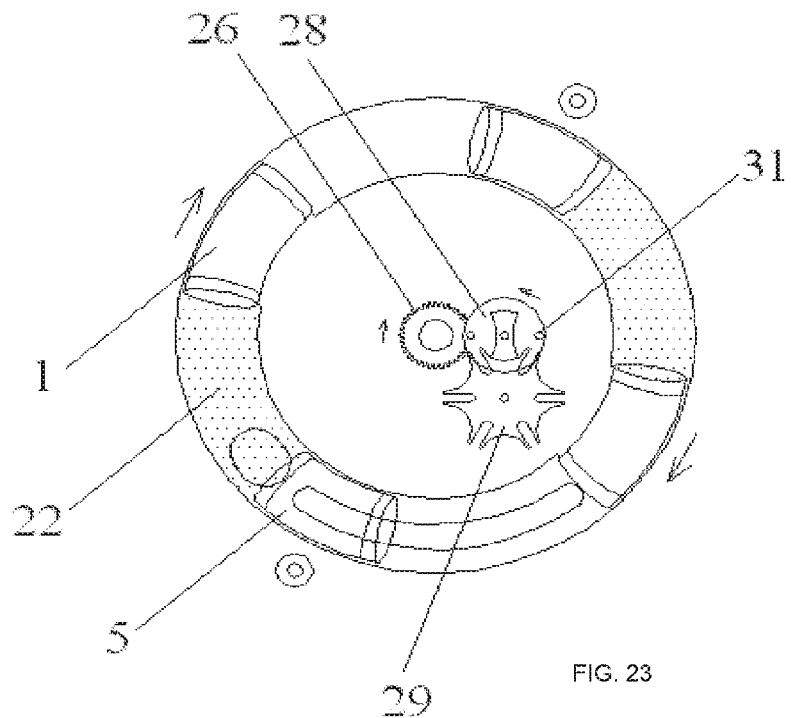
FIG. 23 shows a working chamber, highlighted with dotted filling, at half way of an air intake process.

FIG. 23 is a sketch showing that both pins 31 on driving plate 28 do not engage with the Geneva star wheel 29 yet. At this period, the Geneva star wheel 29 does not turn and passive piston 5 is still at its stationary position. Since power piston 1 is rotating at a constant speed continuously, volume of the working chamber 22 is enlarging gradually. The fresh air or the mixture of air and fuel is sucked into the working chamber 22 through inlet port 20. At approximately that moment, as shown in FIG. 23, the working chamber 22 is at half way of an air intake process.

Figure 24:
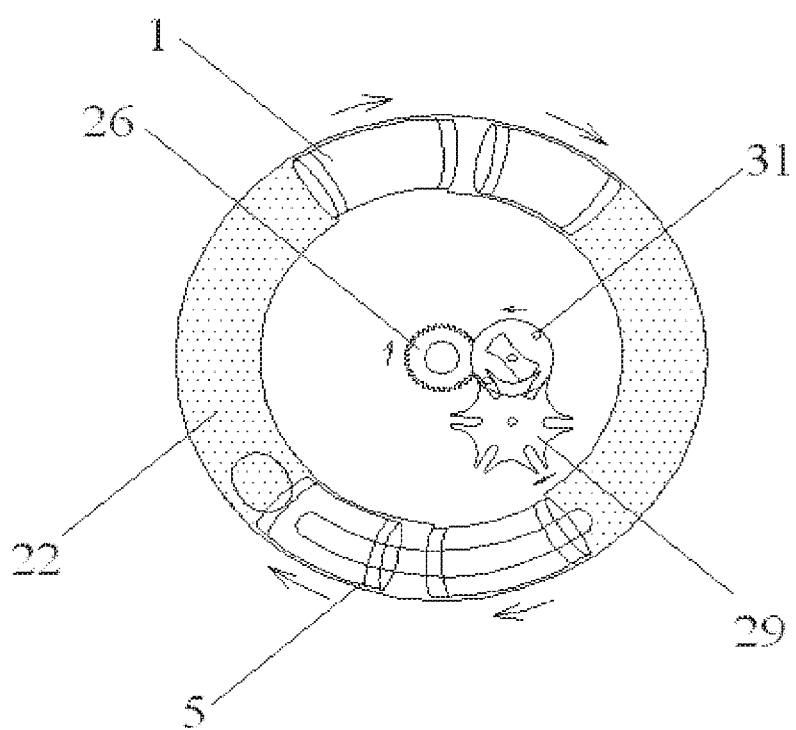
FIG. 24 shows a working chamber, highlighted with dotted filling, at an end of an air intake process.

FIG. 24 is a sketch showing that one of pins 31 on driving plate 28 starts to move into one of slots 30 on the Geneva star wheel 29, and starts to drive the Geneva star wheel 29. As a result, the Geneva star wheel 29 starts to rotate, as well as passive piston 5. By analysis, the Geneva star wheel 29 rotates at a slow starting speed. As a result, passive piston 5 rotates at a slow speed at beginning, requiring a relatively small driving force. At approximately this point of time, volume of the working chamber 22 reaches a maximum, and the working chamber 22 is at an end of the air intake process.

Figure 25:
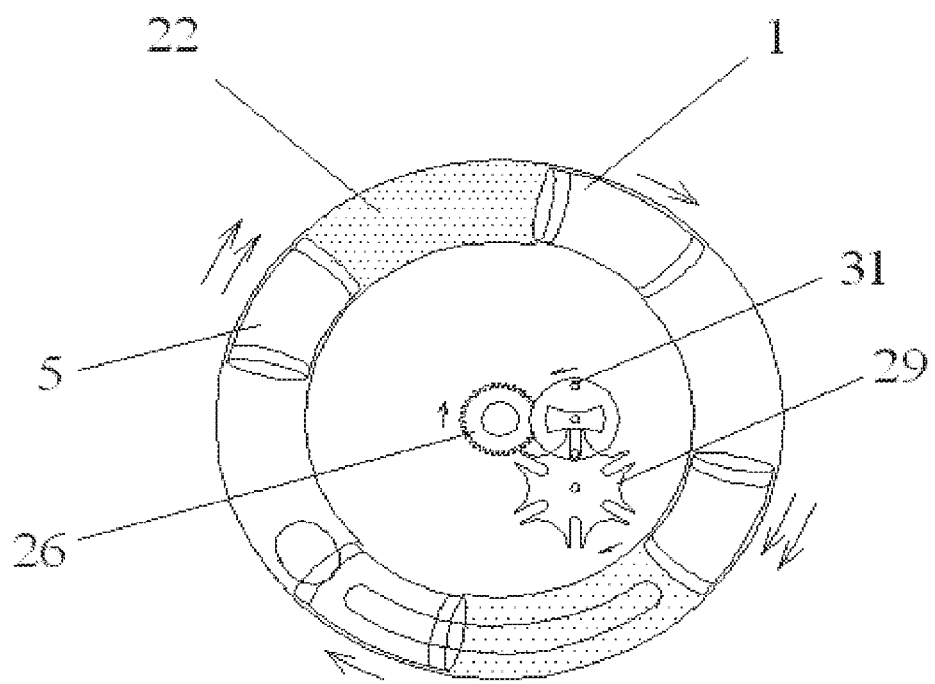
FIG. 25 shows a working chamber, highlighted with dotted filling, at half way of a compression process.

Although the starting speed of the Geneva star wheel 29 is very slow, it is accelerated until reaching its maximum speed as shown in FIG. 25. FIG. 25 shows that pins 31 continually drive the Geneva star wheel 29 to rotate. The rotation speed of wheel 29 is reaching its maximum speed at approximately this moment, so passive piston 5 also rotates at its maximum speed, which is much faster than that of power piston 1. Therefore, at this period, passive piston 5 is chasing up power piston 1 at a much faster speed. As a result, volume of the working chamber 22 is decreasing rapidly, and air or the mixture of air and fuel is compressed. At approximately this moment, the working chamber 22 is at half way of a compression process, as shown in FIG. 25.

Figure 26:
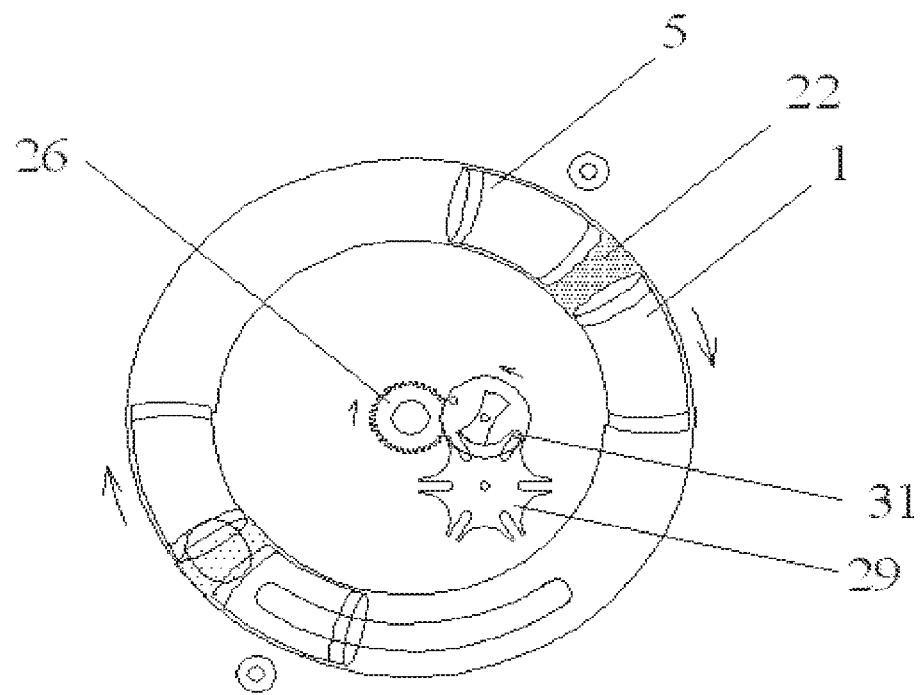
FIG. 26 shows a working chamber, highlighted with dotted filling, at an end of a compression process and starting to ignite.

After the Geneva star wheel 29 reaches its maximum speed, it slows down to a stop, as shown in FIG. 26. FIG. 26 shows that one of the pins 31 is moving out from slot 30 and there is no engagement to the Geneva star wheel 29. At approximately that moment, the Geneva star wheel 29 stops its rotating and piston 5 is at its stationary position once again. Meanwhile, volume of the working chamber 22 reaches a minimum. The compression process comes to end, and ignition and combustion may take place in the working chamber 22.

Figure 27:
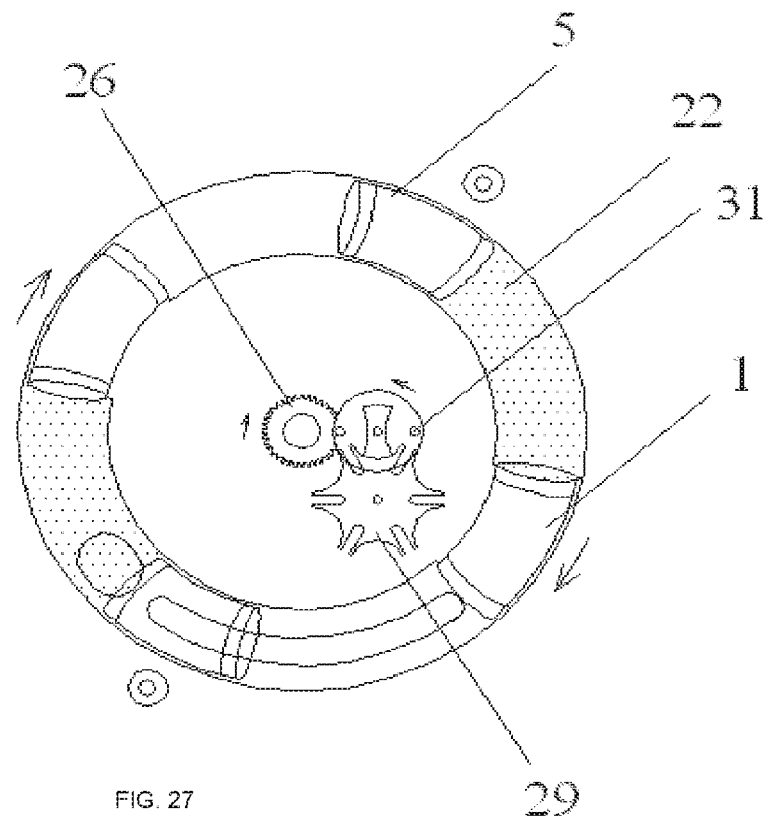
FIG. 27 shows a working chamber, highlighted with dotted filling, in a process of combustion and expansion.

FIG. 27 shows that both the pins 31 on driver plate 28 have moved out from slot 30. The Geneva star wheel 29 and passive piston 5 do not rotate. The mixture of fuel and air is burning and expanding inside the working chamber 22, thus the power piston 1 is pushed to rotate and to output work via shaft 4. It is noted that a stopper is required to stop passive piston 5 moving backward during combustion process.

Figure 28:
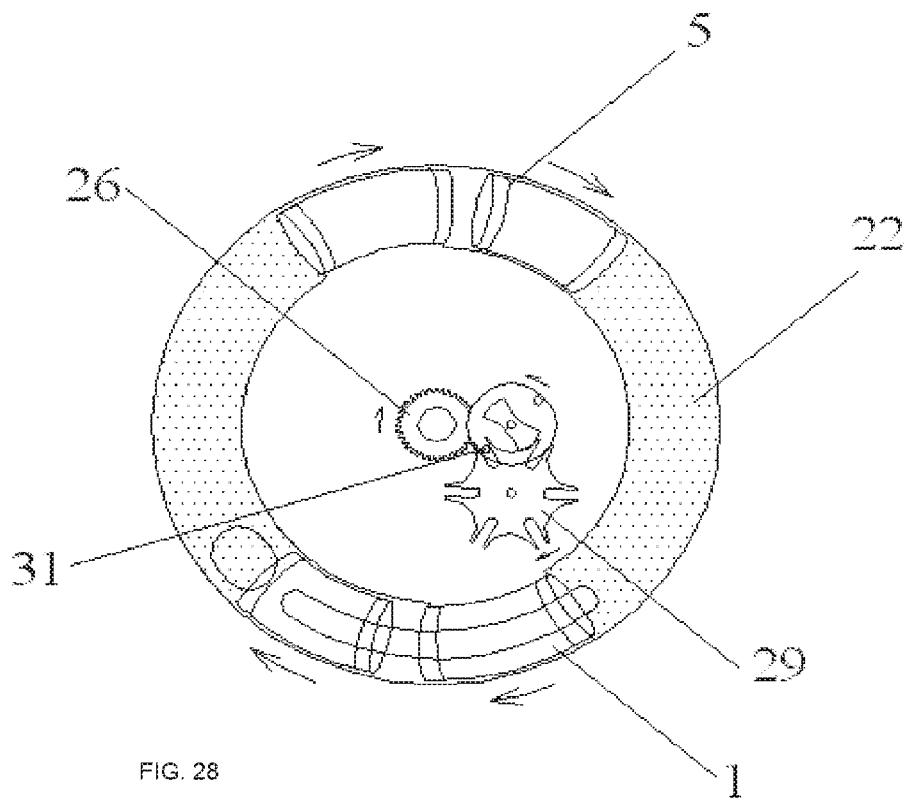
FIG. 28 shows a working chamber, highlighted with dotted filling, at a beginning of exhaust emission.

FIG. 28 shows that one of the pins 31 is moving into slot 30 again and pushing the Geneva star wheel 29 to rotate, hence passive piston 5 also starts to rotate. By analysis, the Geneva star wheel 29 rotates at a slow starting speed. As a result, passive piston 5 rotates at a slow speed at a beginning, requiring a relatively small driving force. At approximately this point in time, the volume of the working chamber 22 reaches its maximum, and power piston 1 reaches exhausted gas outlet port 21, from where the exhausted gas releases.

Figure 29:
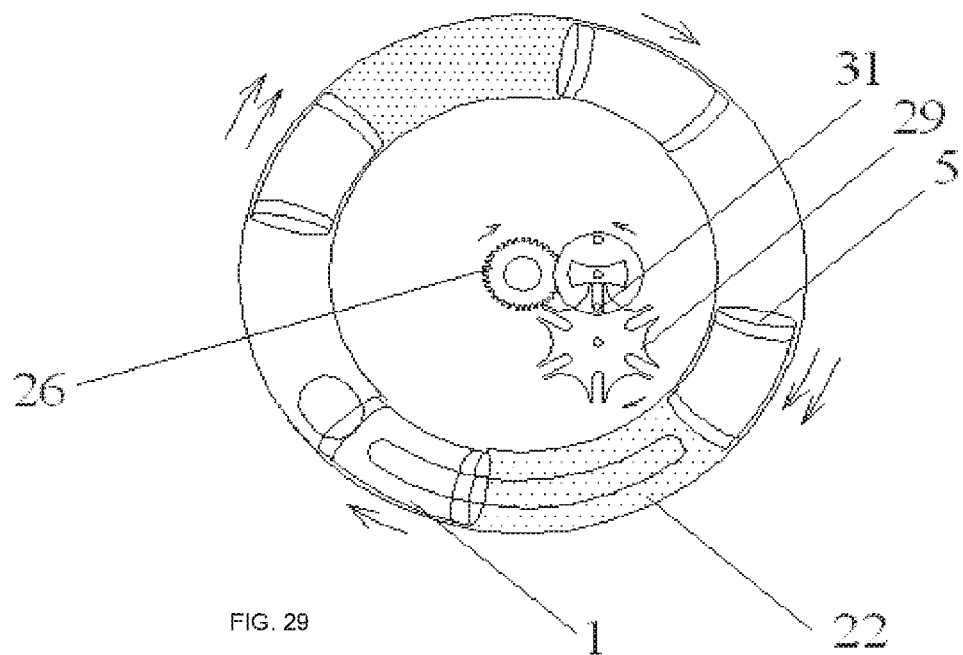
FIG. 29 shows a working chamber, which is highlighted with dotted filling, at half way of an emission process.

Although the starting speed of Geneva star wheel 29 is very slow, it is accelerated until reaching its maximum speed as shown in FIG. 29. FIG. 29 shows that one of the pins 31 continuously drives the Geneva star wheel 29 to rotate. The rotation speed of the Genevea star wheel 29 is reaching its maximum speed at approximately this moment, resulting in passive piston 5 rotating at its maximum speed, which is much higher than that of power piston 1. At approximately this period, passive piston 5 is chasing up power piston 1 at a much faster speed. As a result, the volume of the working chamber 22 is decreasing rapidly. The exhausted gas is pushed out from outlet port 21 by passive piston 5. At approximately this moment, the working chamber 22 is at half way of an emission process.

Figure 30:
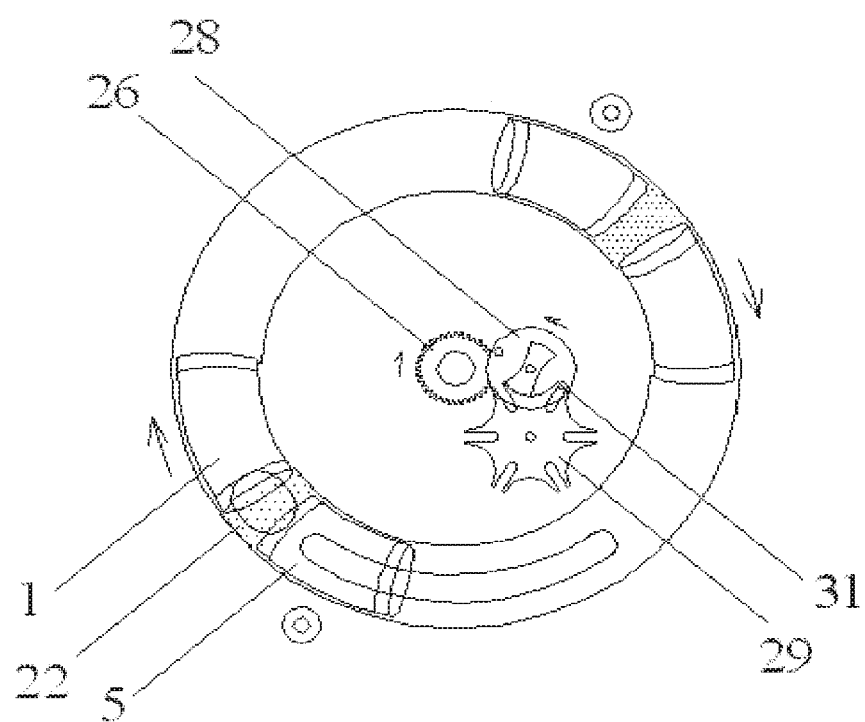
FIG. 30 shows a working chamber, which is highlighted with dotted filling, at a beginning of an air intake process.

After the Geneva star wheel 29 reaches its maximum speed, it is slowed down to a stop, as shown in FIG. 30. FIG. 30 shows that one of the pins 31 is moving out from slot 30. Without engagement by one of the pins 31, the Geneva star wheel 29 may not rotate. As a result, the passive piston 5 is at its stationary position. At this point of time, the working chamber 22 moves out of exhaust outlet port 21 and moves toward air inlet port 20, and the emission process comes to an end. As power piston 1 is still rotating, volume of the working chamber 22 is increasing gradually. At approximately this period, fresh air or the mixture of air and fuel is sucked into the working chamber 22, which comes back to the working stage shown in FIG. 22.

From analysis above on the second implementation, it is known that, within every revolution of the piston's rotation, the working processes of an engine, i.e., air intake, compression, combustion and expansion, and emission, are accomplished. In one embodiment, continuous rotation of power-output shaft 4 is converted to intermittent rotation of passive pistons 5 and 6, through a Geneva mechanism and a speed-increasing gear system, which is not shown in the figures. From analysis, when pins 31 on driver plate 30 push the Geneva star wheel 29 to rotate, the Geneva star wheel 29 rotates at a very slow speed at the beginning, then accelerates to its maximum speed. After that, it slows down to a stop. Since the passive pistons 5 and 6 are driven by the Geneva star wheel 29 and the speed-increasing gear system, the passive pistons 5 and 6 rotate in a similar manner, that is, passive pistons 5 and 6 rotate at a very slow speed at a beginning, then they accelerate to their maximum speed. After that, they slow down to a stop. Smooth movement of passive pistons 5 and 6 may not generate a significant impact force to the gear system and other mechanical parts.

The two implementations mentioned above are using a driving gear on the power-output shaft 4 to drive a gear system, and finally to drive the passive pistons 5 and 6. One of ordinary skill in the art will appreciate that there are many other alternative ways to drive passive pistons, such as using a hydraulic servo system, a servo motor, or an electromagnetic induction etc. A third implementation of the rotary engine, which does not comprise a driving gear on the power-output shaft 4, is discussed further in the following section.

In the third implementation, a driving system comprises springs 32 which are coupled to rears of the passive pistons 5 and 6, and the power pistons 1 and 2. Power pistons 1 and 2 are located at an edge of power disk 3. Passive pistons 5 and 6 are mounted at an edge of passive disk 7, similar to the two implementations discussed hereinabove. In one embodiment, there is no passive disk and passive pistons rotate inside an inner tube of a doughnut-shaped cylinder. There is a groove on the passive piston, which may slid along a guide inside the inner tube of the doughnut-shaped cylinder.

As passive piston 5 is at a back of the working chamber 22, when combustion and expansion take place inside the working chamber 22, expanding gas may push the passive piston 5 to move backward. In one embodiment, a stopper to lock passive piston 5 at a fix position is present. Therefore, the passive piston 5 has to rely on other energy to drive it moving forward. This energy may come from impaction of rotating power piston 1. As continuously moving power piston 1 hits stationary passive piston 5 at spring 32, which may accumulate the impact energy and then release this energy, passive piston 5 is pushed to rotate forward.

FIG. 31 to FIG. 39 show a working principle of the third implementation, which may use springs tail attached to passive pistons.

Figure 31:
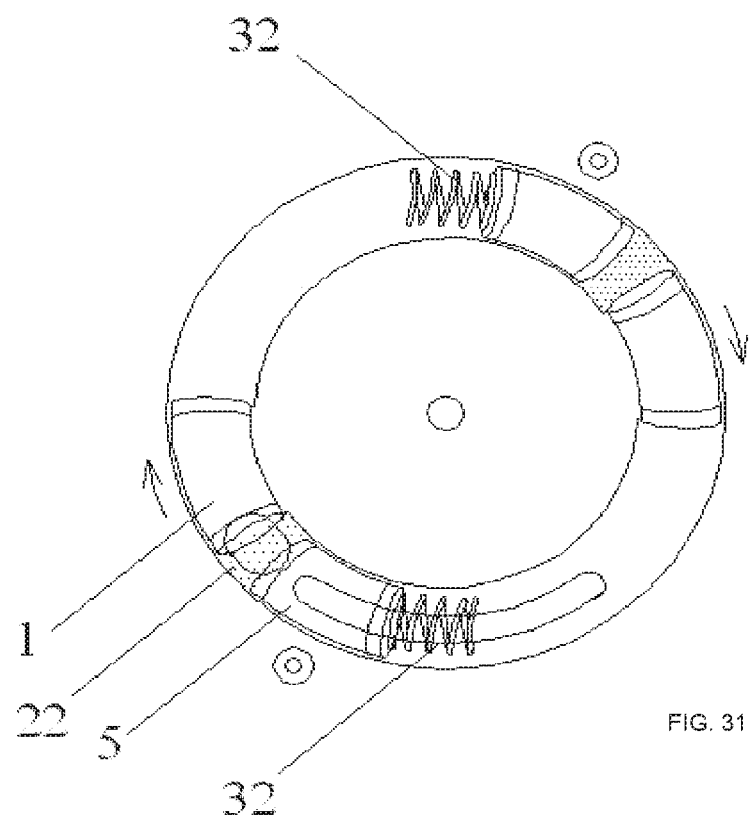
FIG. 31 is a sketch showing a working principle of an embodiment of the present invention, where a working chamber, highlighted with dotted filling, is at a beginning of an air intake process.

FIG. 31 shows that the working chamber 22 is at an air inlet port, and passive piston 5 is at its stationary position. As the power piston 1 is rotating continuously at a constant speed, volume of the working chamber 22 is increasing gradually. At approximately this period, fresh air or the mixture of air and fuel is sucked into the working chamber 22.

Figure 32:
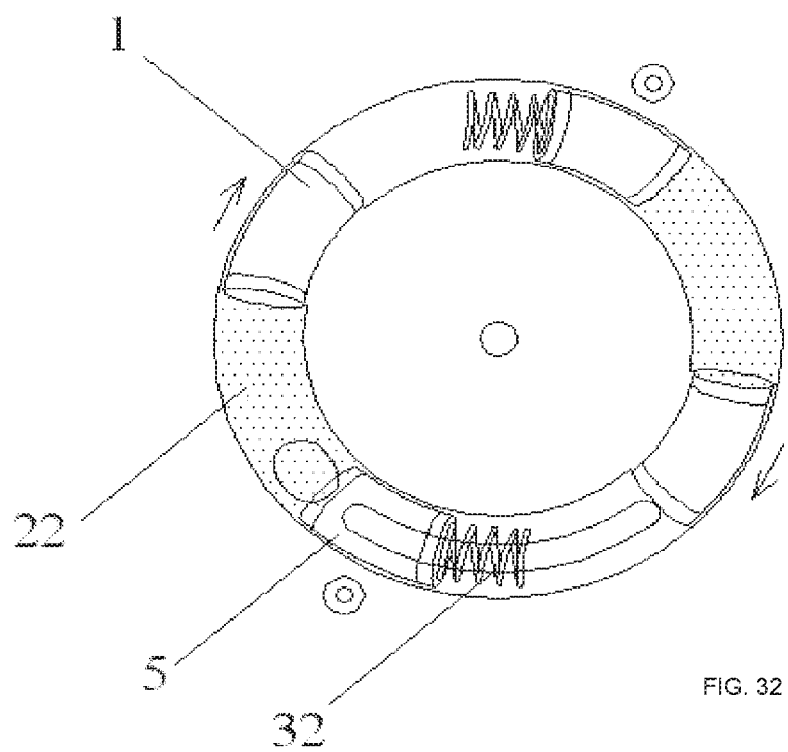
FIG. 32 shows a working chamber, highlighted with dotted filling, at half way of an air intake process.

FIG. 32 shows that the working chamber 22 is at half way of an air-intake process. Power piston 1 is moving continuously at a constant speed. Passive piston 5 is still at its stationary position. More and more fresh air or the mixture of air and fuel is sucked into chamber 22.

Figure 33:
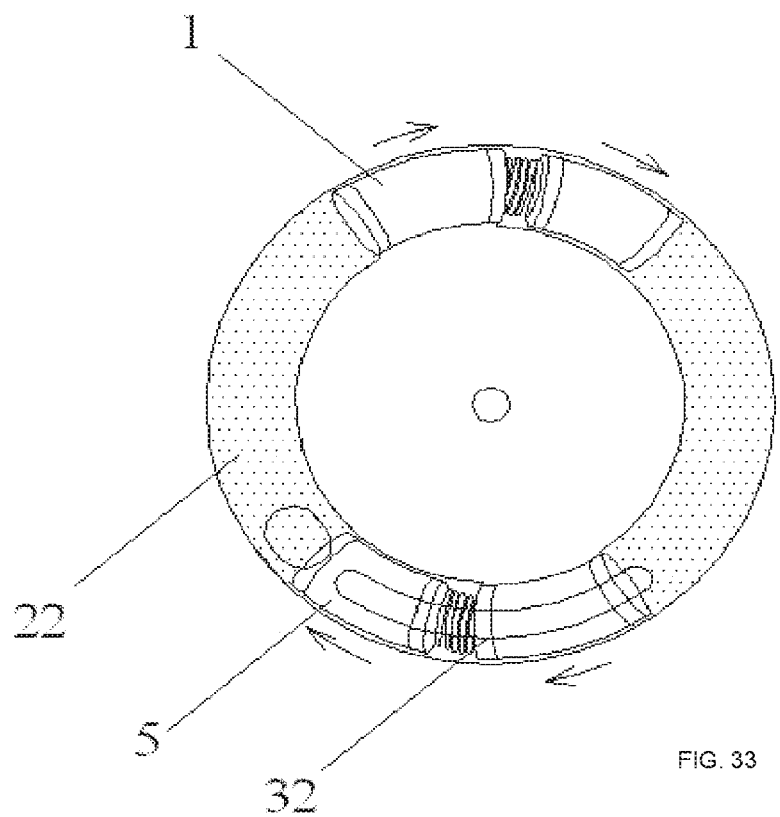
FIG. 33 shows a working chamber, highlighted with dotted filling, at an end of an air intake process.

As the power pistons 1 and 2 continuously rotate, and passive piston 5 and 6 are still at their stationary positions, at a certain moment, power pistons 1 and 2 may hit passive pistons 6 and 5 respectively. FIG. 33 shows that, at approximately this point of time, the power piston 1 is approaching the passive piston 6 in front and compressing its tail spring 32, while power piston 2 is approaching the passive piston 5 in front and compressing its tail spring 32. The working chambers 22 reach their maximum volume.

Figure 34:
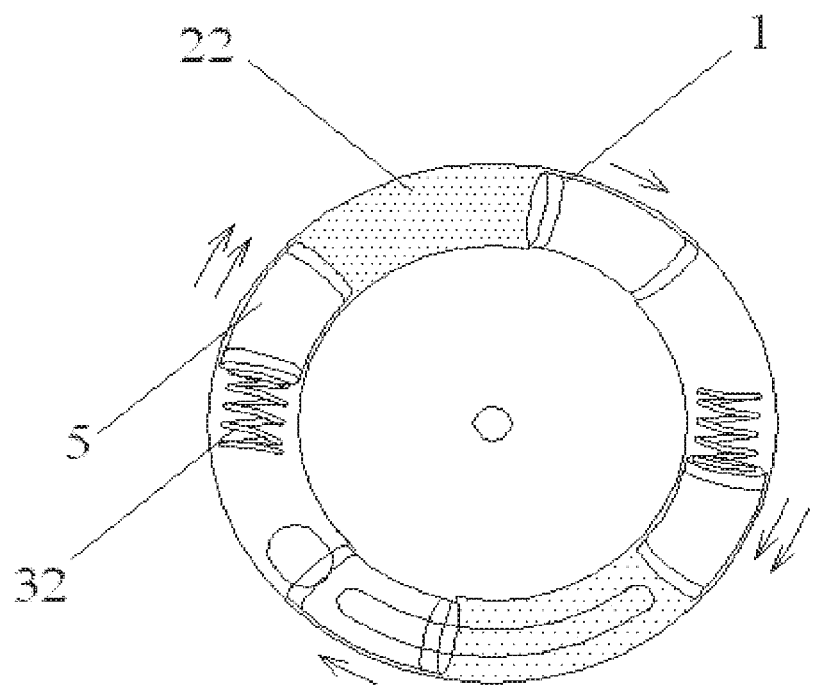
FIG. 34 shows a working chamber, highlighted with dotted filling, at half way of a compression process.

When the power pistons 1 and 2 continuously compress the spring 32, spring 32 may finally push passive pistons 6 and 5 to eject at a much faster speed. FIG. 34 shows that the passive piston 5, pushed by spring 32, is moving at a speed much faster than that of the power piston 1. Volume of chamber 22 is decreasing, causing fresh air or the mixture of air and fuel to be compressed inside the working chamber 22.

Figure 35:
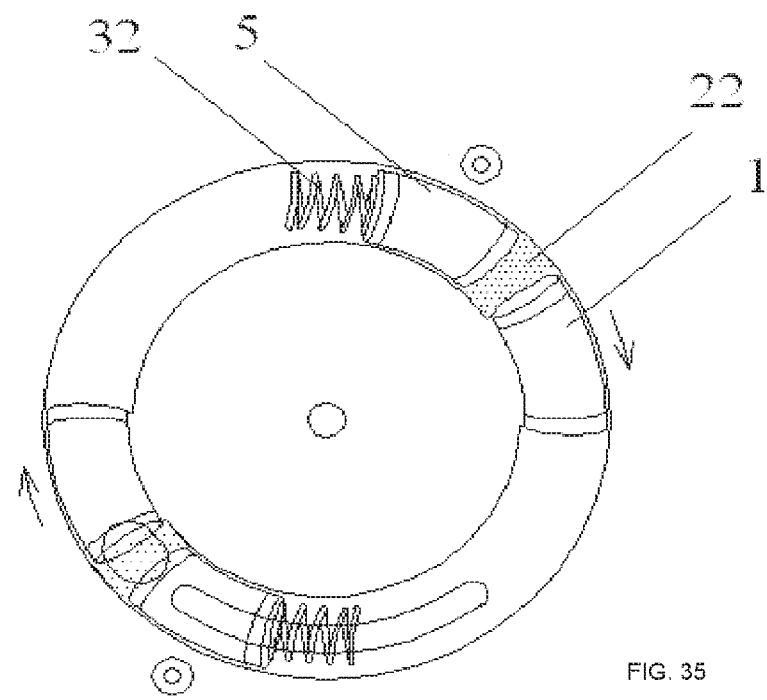
FIG. 35 shows a working chamber, highlighted with dotted filling, at an end of a compression process and starting to ignite.

FIG. 35 shows that the working chamber 22 is at a last stage of a compression process and the mixture of air and fuel is ignited. At approximately this point in time, the working chamber 22 reaches its minimum volume. Gas burning may produce high pressure which may force the passive piston 5 to stop moving. In one embodiment, a stopper to stop the passive piston 5 from moving backwards during the combustion period is present.

Figure 36:
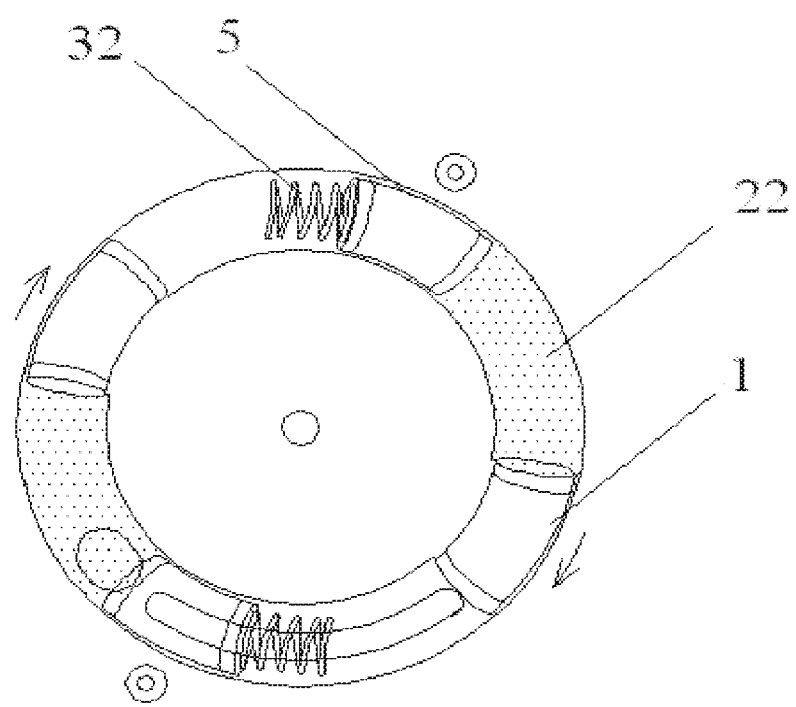
FIG. 36 shows a working chamber, highlighted with dotted filling, in a process of combustion and expansion.

FIG. 36 shows that combustion and expansion take place inside the working chamber 22. At approximately this period, expanding gas pushes the power piston 1 to rotate and outputs power via the shaft 4. In one embodiment, the high pressure inside the working chamber 22 may push the passive piston 5 backward. However, the passive piston 5 may be locked at its stationary position by a stopper.

Figure 37:
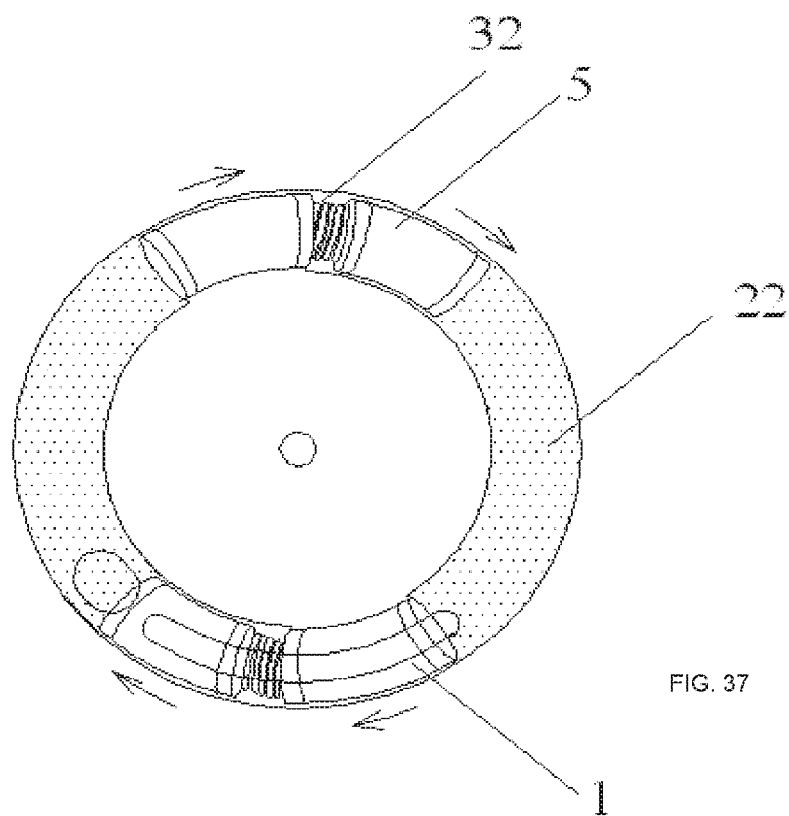
FIG. 37 shows a working chamber, highlighted with dotted filling, at a beginning of exhaust emission.

FIG. 37 shows a last stage of an expansion process in the working chamber 22. At approximately this point in time, the power pistons 1 and 2 are approaching the passive pistons 6 and 5 respectively, and compressing springs 32. Passive piston 5 is at a stage of starting its movement. At approximately this moment, the working chamber 22 reaches its maximum volume and also reaches exhausted gas outlet port 21. The exhausted gas inside the working chamber 22 is configured to release from outlet port 21.

Figure 38:
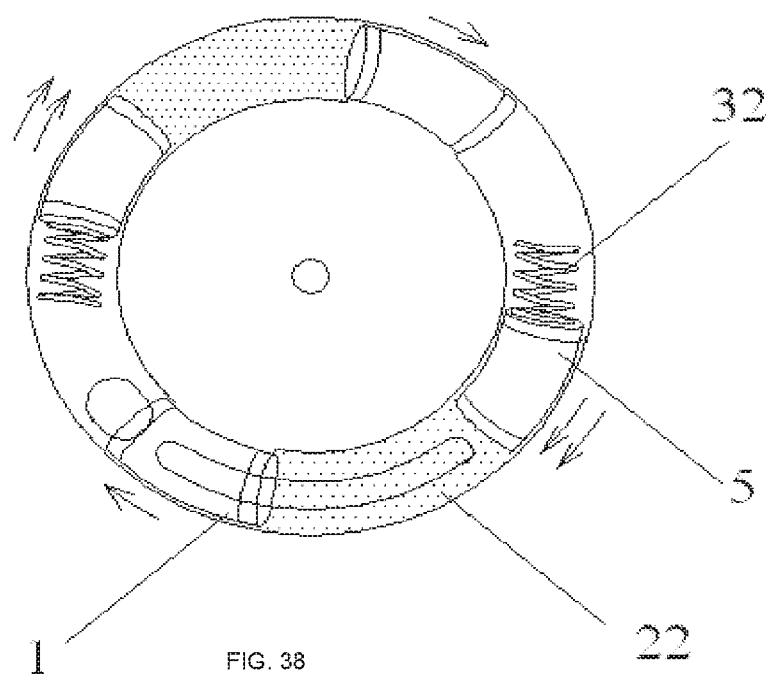
FIG. 38 shows a working chamber, highlighted with dotted filling, at halfway of emission.
Figure 39:
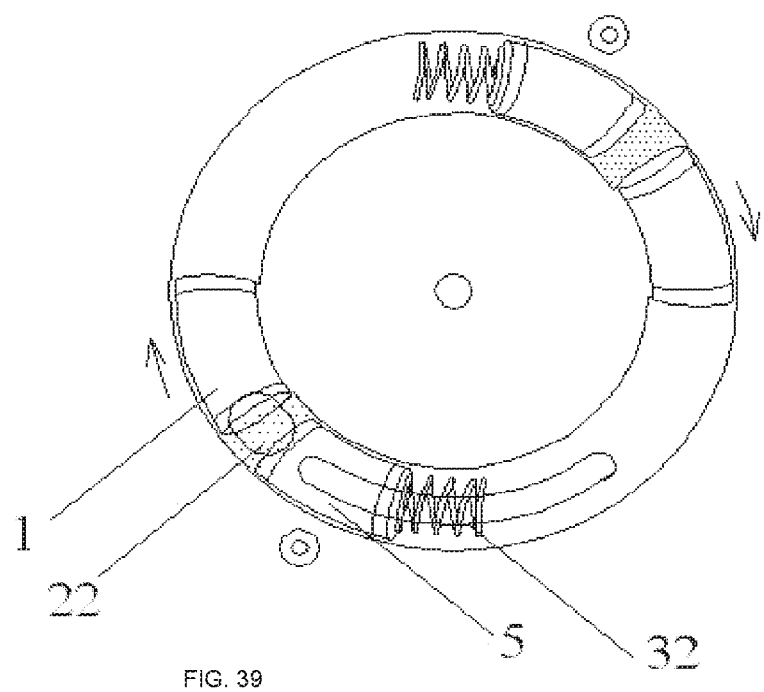
FIG. 39 shows a working chamber, highlighted with dotted filling, at a beginning of an air intake process.

When the power pistons 1 and 2 continuously compress the springs 32, the springs 32 may finally push the passive pistons 6 and 5 to eject at a much faster speed. FIG. 38 shows that the working chamber 22 is at half way of an emission process, in which the passive piston 5, pushed by the spring 32, is moving at a speed much faster than that of the power piston 1 and chasing up the power piston 1. Volume of the working chamber 22 is decreasing rapidly, hence the exhausted gas inside the working chamber 22 is pushed out from the outlet port 21. When the passive piston 5 slides over the exhausted gas outlet port 21, combustion is taking place in second working chamber 34. Gas burning inside second working chamber 34 may produce high pressure which may force the passive pistons 6 and 5 to stop moving. At approximately this period, the working chamber 22 locates at air inlet port 20, as shown in FIG. 39. As the passive piston 5 is at its stationary position and the power piston 1 rotates continuously, the volume of the working chamber 22 is increased gradually. Fresh air or the mixture of air and fuel is sucked into the working chamber 22 through the air inlet port 20. In this period, the working chamber 22 is back to the status shown in FIG. 31. The working processes described above may repeat again and again as the engine runs continuously.

In one embodiment, if a spring force is not enough, it is proposed to add in electromagnetic coils to the passive disk or passive piston to make use of electromagnetic force to assist speed acceleration for the passive pistons 5 and 6. In one embodiment, a hydraulic servo system or a servo motor may be added as an assistant driving force for the passive pistons 5 and 6.

Figure 40:
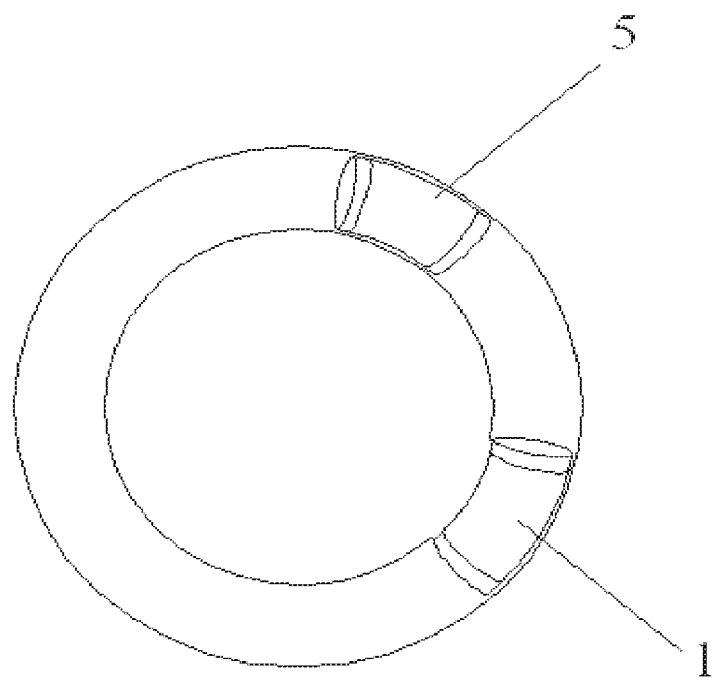
FIG. 40 shows a circular cylinder having a pair of pistons.
Figure 41:
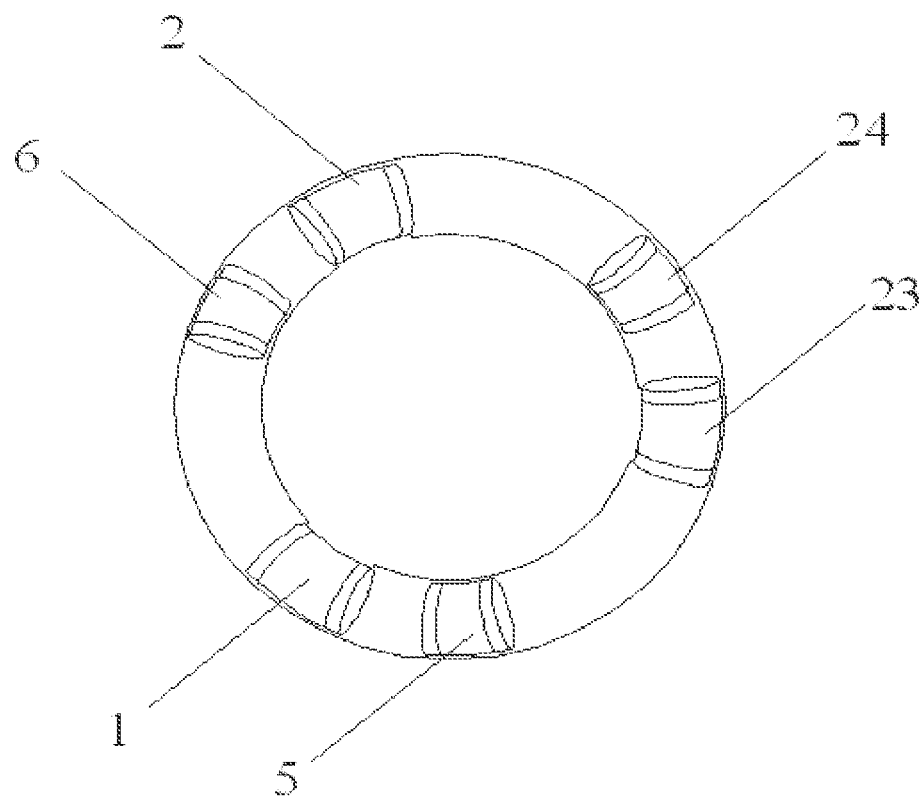
FIG. 41 shows a circular cylinder having three pairs of pistons.
Figure 42:
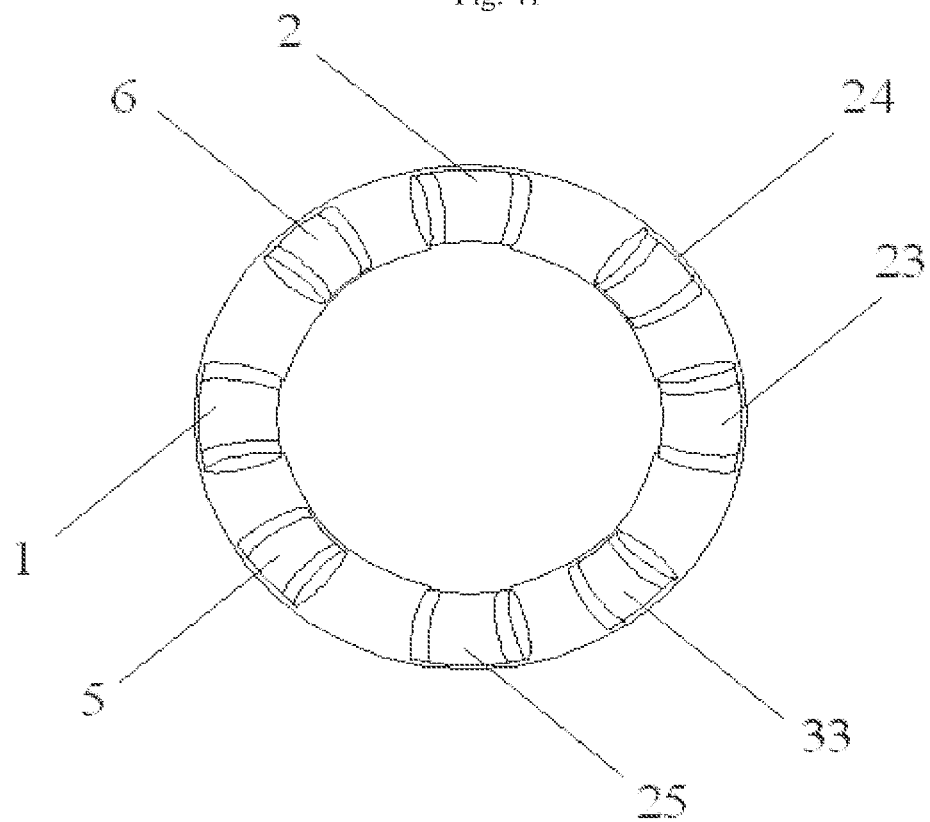
FIG. 42 shows a circular cylinder having four pairs of pistons.

In the above mentioned implementations for the rotary engine, two pairs of working pistons spinning inside a doughnut shaped cylinder are illustrated. In some embodiments, other combinations of working pistons may be designed for a rotary engine. For instance, in one embodiment, one pair of working pistons inside the cylinder, including power piston 1 and passive piston 5, can form one working chamber, as shown in FIG. 40. In another embodiment, FIG. 41 shows a rotary engine with three pairs of working pistons, i.e., power piston 1 pairing with passive piston 5, power piston 2 pairing with passive piston 6, and power piston 23 pairing with passive piston 24. In total, there are 3 working chambers in the cylinder, as shown in FIG. 41. In another embodiment, FIG. 42 shows a rotary engine with four pairs of working pistons in one cylinder, i.e., power piston 1 pairing with passive piston 5, power piston 2 pairing with passive piston 6, power piston 23 pairing with passive piston 24, and power piston 25 pairing with passive piston 33. There are 4 working chambers in the cylinder, as shown in FIG. 42. In yet another embodiment, another practical model of the engine is to stack up a series of cylinders to form a multi-cylinder rotary engine. In such a way of cylinder combination, engine output power may be increased.

In the rotary engine, as the rotation axis for the power disk coincides with that of passive disk, as well as with the central axis of the doughnut-shaped cylinder, rotation of the pistons may never touch the inner wall of the cylinder. Theoretically no frictional resistance occurs between the pistons and cylinder. However, in practice, sealing O-rings may be necessary in between pistons and cylinder, between power disk and passive disk, and between disks and cylinder body. Frictional resistance caused by these sealing O-rings is unavoidable, but is considered relatively small comparing to the frictional resistance between pistons and cylinder and between connecting bar and crankshaft in a reciprocal engine. If the gap between piston and cylinder, the gap between power disk and passive disk, and the gap between disks and cylinder body are made to be small enough, a number of sealing O-rings required may be very few. The frictional resistance could be reduced to a relative minimum.

One of ordinary skill in the art will appreciate that, in the design concept of the rotary engine, without departing from the premise of ordinary ideas and mechanical structures, any changes and modifications to above mentioned solutions shall fall within the scope of the rotary engine.

What is claimed:

1. A rotary engine comprising:
   a doughnut-shaped cylinder; wherein the doughnut-shaped cylinder has at least one air inlet port and at least one exhaust gas outlet port;
   at least one pair of pistons with one power piston and one passive piston; wherein the at least one pair of pistons are disposed inside the doughnut-shaped cylinder, and rotate along the doughnut-shaped cylinder; wherein a space between the one power piston in front and the one passive piston at back forms a working chamber surrounded by inner wall of the doughnut-shaped cylinder; wherein the working chamber receives fuel from the at least one air inlet port and emits exhaust gas from the at least one exhaust gas outlet port;
   a passive disk, wherein the one passive piston is fixed at edge of the passive disk;
   a passive disk bushing being fixed perpendicularly at center of the passive disk;
   a power disk, wherein the one power piston is fixed at its edge of the power disk;
   a power-output shaft, wherein the power-output shaft is fixed perpendicularly at center of the power disk; wherein the power-output shaft is inserted through the passive disk bushing and placed at the center of doughnut-shaped cylinder; and wherein an axis of the power-output shaft is coaxial with an axis of doughnut-shaped cylinder and an axis of the passive disk bushing; and
   an intermittent driving system, wherein the one power piston drives the one passive piston through the intermittent driving system, and wherein the intermittent driving system is configured so as to enable the one power piston to drive the one passive piston in a way that, within one revolution of the power-output shaft's rotation, the one passive piston is driven by the one power piston in some periods but not in other periods, so that the one passive piston rotates at a speed in an intermittent pattern;
   wherein the one power piston and the one passive piston rotate around the axis of the power output shaft; wherein within one revolution of the power-output shaft's rotation, the one power piston rotate continuously at a substantially constant speed and the one passive piston rotates at a speed in an intermittent pattern; thereby volume of the working chamber varies in an intermittent pattern.

2. The rotary engine of claim 1, wherein the intermittent driving system comprises:
   a normal gear being attached onto the power-output shaft and rotating at a constant speed;
   a normal tear-driven gear being driven by the normal gear;
   a driving plate being coaxial with the normal gear-driven gear and rotating together with the normal gear-driven gear; wherein the driving plate comprises one or more pins; and
   a Geneva star wheel containing one or more slots; wherein the Geneva star wheel is driven only when the one or more pins on the driving plate is engaged with the one or more slots; thereby transmitting a continuous rotation to an on-off rotation.

3. The rotary engine of claim 1, wherein the intermittent driving system comprises springs that are attached at rear of the one passive piston, or front part of the one power piston.

4. The rotary engine of claim 1, further comprises sealing O-rings, wherein the sealing O-rings are disposed onto the one power piston and the one passive piston.

5. The rotary engine of claim 1, wherein the cross section of the doughnut-shaped cylinder is of a round shape or an oval shape.

6. The rotary engine of claim 1, further comprising bearings; wherein the bearings are disposed in between the power-output shaft and the passive disk bushing.

7. The rotary engine of claim 1, wherein the doughnut-shaped cylinder is formed by left cylinder body and right cylinder body, and wherein the left and right cylinder body is fastened by screw bolts.

8. The rotary engine of claim 1, further comprising a stopper; wherein the stopper is disposed at the rear of the one passive piston to prevent the one passive piston from moving backward during combustion period.

9. The rotary engine of claim 1, wherein the rotary engine comprises two pairs of pistons with two power pistons and two passive pistons.

10. The rotary engine of claim 1, wherein the rotary engine comprises three pairs of pistons with three power pistons and three passive pistons.

11. The rotary engine of claim 1, wherein the rotary engine comprises four pairs of pistons with four power pistons and four passive pistons.

12. The rotary engine of claim 1, wherein the intermittent driving system comprises
   a partially toothed gear having teeth partially distributed at its circumference, wherein toothed section and untoothed section are distributed in an alternate pattern; wherein the partially toothed gear is mounted onto the power-output shaft;
   a passive disk driving gear being attached to the passive disk;
   a first speed-increasing gear being driven by the partially toothed gear; wherein the first speed-increasing gear rotates only when it engages with toothed section of the partially toothed gear; and
   a second speed-increasing gear being coaxial with the first speed-increasing gear, wherein the first and second speed-increasing gear rotate together; and wherein the second speed-increasing gear drives the passive disk driving gear.

13. The rotary engine of claim 12, wherein the partially toothed gear is configured to have a quarterly distribution of the teeth at the circumference.

14. The rotary engine of claim 1, further comprises sealing rings, wherein the sealing rings are disposed in between the power disk and the inner wall of the cylinder body, in between the power disk and the passive disk, and in between the passive disk and the inner wall of cylinder body.

15. The rotary engine of claim 14, wherein the sealing rings are of a round shape or an oval shape.

\* \* \* \* \*

UNITED STATES PATENT AND TRADEMARK OFFICE
CERTIFICATE OF CORRECTION

PATENT NO. : 10,890,071 B2
APPLICATION NO. : 15/739492
DATED : January 12, 2021
INVENTOR(S) : Li Gongling It is certified that error appears in the above-identified patent and that said Letters Patent is hereby corrected as shown below:

In the Claims

Column 15, Line 51, delete "tear-driven" and replace with "gear-driven".

Signed and Sealed this
Twenty-fifth Day of May, 2021

Drew Hirshfeld
*Performing the Functions and Duties of the
Under Secretary of Commerce for Intellectual Property and
Director of the United States Patent and Trademark Office*